US008238554B2

(12) United States Patent
Hori

(10) Patent No.: US 8,238,554 B2
(45) Date of Patent: *Aug. 7, 2012

(54) METHOD FOR TRANSMISSION/RECEPTION OF CONTENTS USAGE RIGHT INFORMATION IN ENCRYPTED FORM, AND DEVICE THEREOF

(75) Inventor: Yoshihiro Hori, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1480 days.

This patent is subject to a terminal disclaimer.

(21) Appl. No.: 11/186,935

(22) Filed: Jul. 22, 2005

(65) Prior Publication Data

US 2006/0021063 A1    Jan. 26, 2006

(30) Foreign Application Priority Data

Jul. 22, 2004   (JP) ................................. 2004-213690

(51) Int. Cl.
*H04L 29/06* (2006.01)
(52) U.S. Cl. .......................................... 380/255; 726/27
(58) Field of Classification Search ........................ None
See application file for complete search history.

(56) References Cited

U.S. PATENT DOCUMENTS

| 6,507,907 | B1 * | 1/2003 | Takahashi et al. ............ 713/150 |
| 7,428,307 | B2 * | 9/2008 | Hori et al. ..................... 380/277 |
| 7,433,474 | B2 * | 10/2008 | Kato et al. ..................... 380/284 |
| 2003/0105718 | A1 * | 6/2003 | Hurtado et al. ................. 705/51 |
| 2006/0195405 | A1 * | 8/2006 | Miura et al. .................... 705/65 |

FOREIGN PATENT DOCUMENTS

JP           2004-133654 A      4/2004

* cited by examiner

*Primary Examiner* — Nasser Goodarzi
*Assistant Examiner* — Fatoumata Traore
(74) *Attorney, Agent, or Firm* — McDermott Will & Emery LLP

(57) ABSTRACT

Upon a license-data transmitter verifying a certificate C[KPdx] (the license-data receiver and the license-data transmitter will be referred to as "x" and "y", respectively), the license-data transmitter transmits challenge information Ep(KPdx, Kcy) to the license-data receiver. In response to the challenge information, the license-data receiver transmits session information Es(Kcy, Ksx//KPpy) to the license-data transmitter. The license-data transmitter provides encrypted license data Es(Ksx, Ep(KPpx, LIC)) in a form encrypted using these two keys Ksx and KPpx thus received. With the cryptosystem according to the present invention employing EC-DH as the public key cryptosystem, the transmitter provides the second or subsequent license data without transmission of the challenge information and without updating the shared key.

2 Claims, 12 Drawing Sheets

METHOD FOR TRANSMISSION/RECEPTION OF CONTENTS USAGE RIGHT INFORMATION IN ENCRYPTED FORM, AND DEVICE THEREOF

BACKGROUND OF THE INVENTION

1. Field of the Invention

The present invention relates to a data input/output technique, and particularly to a technique for input/output of encrypted data, which is to be kept secret, between a storage device and a host device.

2. Description of the Related Art

As a contents data distribution system with improved security of license data, a contents data distribution system disclosed in Japanese Patent Application Laid-open No. 2004-133654 is known, for example. With such a system, the devices handling the license data in the non-encrypted form are classified into three kinds of devices, i.e., a server, a memory card (storage device), and a decoder (user device). Transmission/reception of the license data is performed between the devices (between the server and the storage device, or between the storage device and the user device) through an encrypted communication path established therebetween. Note that each of the server, the storage device, and the user device, includes a TRM (Tamper Resistant Module) for handling the license data in an encrypted form.

With establishment of the encrypted communication path, first, a device receiving license data (which will be referred to as "license receiver") transmits a certificate including a public key to a device providing the license data (which will be referred to as "license provider"). Then, the license provider verifies the certificate of the license receiver. As a result of the verification, only in a case that determination has been made that the certificate is valid, and the certificate is not listed in the certification revocation list, key sharing is performed between the two devices using the public key included in the certificate. Then, the license provider transmits license data in a form encrypted using a key received from the license receiver in the key sharing.

The TRM is a circuit module which physically protects the security thereof. The TRM has a configuration which restricts access from other circuits, except through the encrypted communication path.

Note that in a case of acquisition of the license data, the memory card, which is mounted to a terminal having a function of communication with the server, receives the license data from the server through the terminal. On the other hand, in a case of using contents, the memory card, which is mounted to the terminal including a built-in decoder, transmits the license data to the decoder through the terminal.

As described above, such a contents distribution service provides encryption of: the contents data and security of the license data, thereby ensuring copyright protection with regard to the contents. Such ensuring of the contents copyright protection protects the right of the copyright holder of the contents. This provides a reliable contents distribution system which allows the user to add new contents to the lineup for contents distribution service with high security, thereby meeting the needs of the user over a wider range.

Video contents having a specification of the high-definition TV are being widespread. Here, video contents having a specification of high-definition TVs will be referred to as "HD contents". On the other hand, video contents having a specification of conventional TVs will be referred to as "SD contents".

HD contents have a larger data amount per unit time than that of the SD contents. For example, with the MPEG2 method employed in digital broadcasting, the HD contents have approximately three times the date amount per unit time of that of the SD contents. Such a system handling a large data amount requires higher-speed access of the storage device storing the HD contents.

Now, let us consider an arrangement in which the copyright protection function of the conventional systems is applied to such HD contents. With the conventional systems, transmission/reception of the license data is performed using the public key encryption system. The public key encryption system requires longer time than with the symmetric key encryptosystem. That is to say, with the conventional systems, transmission/reception of the license data requires access time corresponding to computation time for the public key encryptosystem.

In a case that the license data is recorded in increments of programs or the like, and the programs are reproduced in increments of programs, the system accesses the license data with a low frequency. Accordingly, in this case, the access time is negligible. On the other hand, in a case of providing special reproduction (skip reproduction, program reproduction which is reproduction of parts of multiple programs following a sequence programmed by the user, and so forth), the system accesses the license data with a higher frequency. Accordingly, such special reproduction requires higher-speed access of the license data.

SUMMARY OF THE INVENTION

The present invention has been made in view of the above problems, and accordingly, it is an object thereof to provide a technique for reducing the access time required for input/output of encrypted data with high security between a storage device and a host device.

In view of the aforementioned problems, the present invention has the features as follows.

A first aspect of the present invention relates to a contents usage right information transmission method for transmission/reception of contents usage right information containing a contents key for decrypting encrypted contents data. The first aspect of the present invention method comprises: a transmitter of the content usage right information authorizing a receiver of the content usage right information; sharing a first symmetric key, in a case that the receiver has been authorized, between the transmitter and the receiver; and the transmitter encrypting the content usage right information and transmitting the content usage right information thus encrypted to the receiver, wherein the sharing a first symmetric key includes: creating data used for sharing the first symmetric key with the transmitter and the receiver using a public key of the receiver based upon an Elliptic-Curve Diffie-Hellman scheme; and transmitting the data to another device, and wherein the transmitter encrypting and transmitting the content usage right information includes: sharing a second symmetric key, at the time of transmission of the content usage right information, between the transmitter and the receiver; and the transmitter encrypting the content usage right information using the first symmetric key and the second symmetric key and transmitting the content usage right information thus encrypted to the receiver.

This enables sharing of a symmetric key (shared key) with high security using a public key cryptosystem based upon computation on an elliptic curve. Furthermore, an arrangement may be made in which a symmetric key once shared between a transmitter and a receiver is held by both the transmitter and the receiver, thereby performing encryption/decryption of license data using the same symmetric key thus held. This reduces the computation amount necessary for transmission/reception of the license data, thereby realizing high-speed processing as well as enabling the circuit scale to be reduced. Such an arrangement allows transmission/reception of confidential data such as contents usage right information and so forth in an encrypted form using the symmetric key cryptosystem alone, without using the public key cryptosystem, after establishment of an encrypted communication path. The symmetric key cryptosystem requires smaller computation amount than that of the public key cryptosystem. Furthermore, the symmetric key cryptosystem can be readily realized by hardware means. Thus, such an arrangement using the symmetric key cryptosystem alone improves the processing efficiency and the processing speed. Furthermore, with such an arrangement, the contents usage right information is encrypted twofold using the first and second symmetric keys for transmission/reception thereof, thereby enabling efficient transmission/reception of encrypted data without deterioration in the security.

The first symmetric key may be held by the transmitter and the receiver even after the transmitter transmitting the content usage right information, thereby transmitting the next content usage right information using the same first symmetric key. Also, an arrangement may be made in which at the time of transmission of the content usage right information, in a case that the first symmetric key has been shared between the transmitter and the receiver, the authorizing the receiver and the sharing the first symmetric key are omitted. This enables high-speed consecutive transmission/reception of contents usage right information without deterioration in the security. Also an arrangement may be made in which in a case of consecutive transmission/reception of the contents usage right information, authorizing processing is omitted, thereby realizing high-speed processing without deterioration in the security. Also, an arrangement may be made in which in a case that there is the need to verify the validity of the receiver again, the first symmetric key already shared is discarded, and the sharing the first symmetric key is executed, thereby sharing a first symmetric key which has been issued anew. For example, with such an arrangement, in a case that the encrypted communication path which has been once established cannot be maintained due to disconnection between the devices, either of the devices being turned off, or the like, the first symmetric key is discarded, thereby disconnecting the encrypted communication path. This secures the security of the encrypted communication path.

An arrangement may be made in which after completion of the transmitting and/or receiving the content usage right information, a new second symmetric key is issued and shared between the transmitter and the receiver at the time of transmission of the next content usage right information. Furthermore, an arrangement may be made in which the second symmetric key is issued anew for each transmission of the contents usage right information. With such an arrangement, the contents usage right information is encrypted using the second symmetric key which has been issued anew for each transmission thereof. This prevents leakage of the contents usage right information, thereby improving the security thereof.

An arrangement may be made in which the first symmetric key is issued by one of the transmitter and the receiver, and the second symmetric key is issued by the other. This prevents leakage of the contents usage right information even if either of the transmitter or receiver is an unauthorized device, thereby improving the security.

The contents usage right information transmission method may further comprise sharing a third symmetric key between the transmitter and the receiver for sharing the second symmetric key, wherein in the sharing the second symmetric key, the second-symmetric key is transmitted in a form encrypted using the third symmetric key, thereby sharing the second symmetric key between the transmitter and the receiver. Also, in the sharing the second symmetric key, the second symmetric key may be exchanged between the transmitter and the receiver in a form encrypted using the third symmetric key, thereby sharing the second key between the transmitter and the receiver. The third symmetric key may be shared between the transmitter and the receiver using the public key cryptosystem. Also, an arrangement may be made in which the third symmetric key is held by the transmitter and the receiver even after completion of transmission of the contents usage right information, thereby sharing the second symmetric key next time using the same third symmetric key. With such an arrangement, encryption/decryption is performed using the symmetric-key cryptosystem alone without the public key cryptosystem after establishment of the encryption communication path. This improves processing efficiency and the processing speed.

An arrangement may be made in which in a case that there is the need to verify the validity of the contents usage right information receiving device, the third symmetric key already shared is discarded, and a third symmetric key issued anew is shared between the transmitter and the receiver. This secures the security of the encryption communication.

A second aspect of the present invention relates to a contents usage right information providing device for providing contents usage right information containing a contents key for decrypting encrypted contents data. The contents usage right information providing device comprises: a verification unit which acquires verification information from the content usage right information receiving device, and verifying the validity of the verification information; a first symmetric key sharing unit which shares a first symmetric key with the content usage right information receiving device using a public key cryptosystem in a case that the verification unit has authorized the content usage information receiving device; a second symmetric key sharing unit which shares a second symmetric key with the content usage right information receiving device at the time of transmission of the content usage right information; an encryption unit which encrypts the content usage right information using the first symmetric key and the second symmetric key; and a content usage right information transmitting unit which transmits the content usage right information, which has been encrypted by the encryption unit, to the content usage right information receiving device, wherein the first symmetric key sharing unit includes: a random number generating unit which generates a random number, a first symmetric key creating unit which creates the first symmetric key using the random number and a public key of the content usage right information receiving device based upon Elliptic Curve Diffie-Hellman scheme, and creates data for sharing the first symmetric key with the content usage right information receiving device, and a transmitting unit which transmits the data to the content usage right information receiving device.

A third aspect of the present invention relates to a contents usage right information receiving device for receiving contents usage right information containing a contents key for decrypting encrypted contents data from a contents usage right information providing device. The contents usage right information receiving device comprises: a certification information transmission unit which transmits certification information thereof to the content usage right information providing device; a first symmetric key sharing unit which shares a first symmetric key with the content usage right information providing device using a public key cryptosystem in a case that the content usage right information providing device has authenticated the certification information; a second symmetric key sharing unit which shares a second symmetric key with the content usage right information providing device at the time of reception of the content usage right information; a content usage information receiving unit which receives the content usage right information, which has been encrypted using the first symmetric key and the second symmetric key, from the content usage right information providing device; and a decryption unit which decrypts the content usage right information thus encrypted, wherein the first symmetric key sharing unit includes: a public key providing unit which provides a public key thereof to the content usage right information providing device; an acquisition unit which acquires data for sharing the first symmetric key with the content usage right information providing device; and a first symmetric key creating unit which creates the first symmetric key using the data and a private key forming a pair along with the public key based upon Elliptic Curve Diffie-Hellman scheme.

A fourth aspect of the present invention relates to a contents usage right information providing device for providing contents usage right information containing a contents key for decrypting encrypted contents data to a contents usage right information receiving device. The contents usage right information providing device comprises: an interface for controlling transmission/reception of data to/from the content usage right information receiving device; a symmetric key creating unit for creating a first symmetric key temporarily used for communication with the content usage right information receiving device; a first encryption unit for encrypting data using a first public key set for the content usage right information receiving device; a decryption unit for decrypting data using the first symmetric key created by the symmetric key creating unit; a second encryption unit for encrypting data using a second public key based upon Elliptic curve Diffie-Hellman scheme; the second public key having been set for the content usage right information receiving device to be used for an elliptic curve encryption; a random number creating unit for creating a random number and supplying the random number thus created, to the second encryption unit; a third encryption unit for encrypting data using a second symmetric key created by the content usage right information receiving device; and a control unit, wherein the first encryption processing using the second public key performed after creation of the first symmetric key at the symmetric key creating unit comprises: processing in which the second encryption unit receives a random number created by the random number creating unit; processing in which the second encryption unit creates a shared key used for encryption and data for sharing the shared key with the content usage right information receiving device using the random number thus acquired and the second public key, processing in which the second encryption unit encrypts data using the shared key thus created; and wherein the second or subsequent encryption processing after creation of the first symmetric key at the symmetric key creating unit comprises: processing in which the second encryption unit encrypts the content usage right information using the shared key which has been used for the previous encryption, and wherein the control unit controls the symmetric key creating unit so as to create the first symmetric key, and wherein the control unit receives the first symmetric key, which has been encrypted by the first encryption unit using the first public key, and transmits the encrypted first symmetric key thus received to the content usage right information receiving device through the interface, and wherein the control unit receives the second symmetric key and the second public key, which have been encrypted using the first symmetric key, from the content usage right information receiving device through the interface, and transmits the second symmetric key and the second public key, each of which has been encrypted, to the decryption unit, and wherein the control unit receives encrypted content usage right information, which has been encrypted using the shared key created based on the second public key and the second symmetric key from the second encryption unit or the third encryption unit, and transmits the encrypted content usage right information to the content usage right information receiving device through the interface.

The content usage right information providing device may further comprise a content encryption unit for creating the content usage right information, and encrypting content data using the content key contained in the content usage right information thus created, wherein the control unit may acquire the content usage right information created by the content encryption unit, and transmits the content usage right information thus acquired, to the third encryption unit.

The content usage right information providing device may further comprise a storage unit for storing the content usage right information, wherein the control unit may acquire the content usage right information from the storage unit, and transmits the content usage right information thus acquired, to the third encryption unit.

The storage unit may include: a first storage unit for storing the encrypted content data; and a second storage unit for storing the content usage right information, and wherein the second storage unit may have a tamper-resistant configuration with high security.

A fifth aspect of the present invention relates to a contents usage right information receiving device for receiving contents usage right information containing a contents key for decrypting and reproducing encrypted contents data from a contents usage right information providing device. The contents usage right information receiving device comprises: an interface for controlling transmission/reception of data to/from the content usage right information providing device; a first private key holding unit for holding a first private key for decrypting encrypted data which has been encrypted using a first public key set for the content usage right information receiving device; a second public key holding unit for holding a second public key which has been set for the content usage right information receiving device to be used for elliptic curve encryption; a second private key holding unit for holding a second private key for decrypting encrypted data which has been encrypted using the second public key; a first decryption unit for decrypting encrypted data, which has been encrypted using the first public key, using the first private key; an encryption unit for encrypting data using a first symmetric key created by the content usage right information providing device; a symmetric key creating unit for creating a second symmetric key for establishing communication with the content usage right providing device; a second decryption unit for decrypting encrypted data using the second symmetric key; a third decryption unit for decrypting encrypted data, which has been encrypted using the second public key, using the second private key based upon Elliptic curve Diffie-Hellman scheme; and a control unit; wherein the third decryption unit has functions of creating a shared key based on the data for sharing the shared key and the second private key acquired from the content usage right information providing device; and decrypting data encrypted using the shared key, wherein the first decryption processing for decrypting data encrypted using the second public key performed after decryption of the first symmetric key at the first decryption unit comprises: processing in which the third decryption unit creates the shared key using the data used for sharing and the second private key, and processing in which the third decryption unit decrypts the encrypted content usage right information using the shared key thus created, and wherein, in the second or subsequent encryption processing performed after decryption of the first symmetric key at the first decryption unit, the third decryption unit decrypts the encrypted content usage right information using the shared key which has been used for the previous decryption, and wherein the control unit receives the first symmetric key, which has been encrypted using the first public key, through the interface, and transmits the encrypted first symmetric key thus received, to the first decryption unit, and wherein the control unit controls the symmetric key creating unit so as to create the second symmetric key, and wherein the control unit transmits the second symmetric key and the second public key, each of which has been encrypted by the encryption unit using the first symmetric key, to the content usage right information providing device through the interface, and wherein the control unit receives encrypted content usage right information, which has been encrypted using the second public key and the second symmetric key, through the interface, and wherein the control unit transmits the encrypted content usage information thus received, to the second decryption unit. The content usage right information receiving device may further comprise a content reproducing unit for decrypting the encrypted content data using the content key contained in the content usage right information acquired by the third decryption unit, and reproducing the content data thus decrypted.

The content usage right information receiving device may further comprise a storage unit for storing the content usage right information, wherein the control unit may store the content usage right, information acquired by the third decryption unit, in the storage unit.

The features and technological significance of the present invention will become apparent from the following description of the embodiments. It should be clearly understood that the embodiments will be described for exemplary purposes only, and that the meanings of the technical terms given in this description of the present invention or the components thereof by way of embodiments are by no means intended to be interpreted restrictively.

DETAILED DESCRIPTION OF THE INVENTION

First Embodiment

Figure 1:
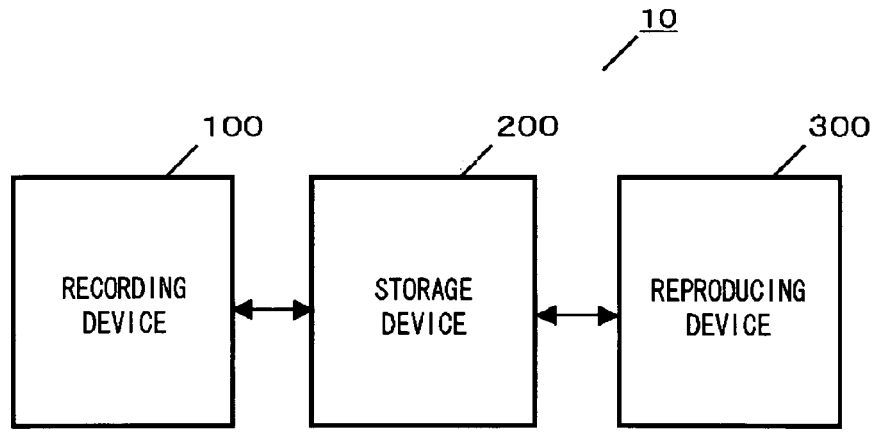
FIG. 1 is a diagram which shows an overall configuration of a data recording/reproducing device according to a first embodiment.

FIG. 1 shows an overall configuration of a data management system 10 according to a first embodiment. The data management system 10 includes: a recording device 100 for controlling recording of data on a storage device 200; a reproducing device 300 for controlling reproduction of the data recorded on the storage device 200; and the storage device 200 for storing and recording the data. The term storage device 200 as used in the present embodiment does not represent a recording medium alone for storing data. Rather, the storage device 200 is a storage device formed of a combination of a recording medium and a drive. The storage device 200 includes a controller for controlling input/output of data between: a host device such as the recording device 100, the reproducing device 300, and so forth; and the recording medium. Description will be made in the present embodiment regarding an example employing a hard disk drive as the storage device 200.

In general, conventional hard disk drives are used in the state in which each hard disk drive is fixedly connected to a certain host device. On the other hand, the storage device 200 according to the present embodiment has a configuration which allows the user to detach the storage device 200 from a host device such as the recording device 100, the reproducing device 300, and so forth. That is to say, the user can detach the storage device 200 from the host device in the same way as with CD, DVD, and so forth. Thus, such a function allows sharing of the storage device 200 between multiple host devices such as the recording device 100, the reproducing device 300, a recording/reproducing device having both functions of recording and reproducing, and so forth.

As described above, the storage device 200 according to the present embodiment has a function of being shared between multiple host devices. This may lead a problem that the data stored in the storage device 200 is read out by a third party through an unauthorized host device. Let us say that the storage device 200 stores contents such as audio contents, video contents, and so forth, protected by the copyright, or confidential information such as personal information, corporation data, and so forth. In order to prevent leakage of such kinds of confidential data, the storage device 200 preferably has an appropriate configuration for protecting the data, i.e., preferably has a sufficient tamper-resistant function.

From such a perspective, the storage device 200 according to the present embodiment has a configuration which allows exchange of confidential data in an encrypted form between the storage device 200 and the host device at the time of input/output of the confidential data therebetween. Furthermore, the storage device 200 has a confidential data storage area separate from an ordinary storage area, for storing confidential data. With such a configuration, no external circuit accesses the confidential data storage area except through an encryption engine included in the storage device 200. The encryption engine allows input/output of confidential data to/from a host device, only in a case that the host device has been verified as an authorized host device. Such a data protection function will also be referred to as "secure function" hereafter. The aforementioned configuration and function provides appropriate protection of the confidential data stored in the storage device 200.

The secure function of the storage device 200 is preferably designed so as to maintain the advantages of serving as a removable medium as much as possible. That is to say, the storage device 200 is preferably designed so as to allow input/output of ordinary data to/from a host device, even if the host device has no secure function. Accordingly, the storage device 200 according to the present embodiment is designed stipulated by ATA (AT attachment) which is a standard of ANSI (American National Standards Institute), thereby maintaining compatibility with conventional hard disks. That is to say, the aforementioned secure function is realized in the form of expanded commands of ATA.

Description will be made below regarding an example of input/output of confidential data in which the contents data such as video contents are recorded and reproduced. While the contents data may be handled as confidential data, description will be made below regarding an arrangement in which the contents data is encrypted, and the contents data thus encrypted is stored in the storage device 200 as ordinary data. With such a configuration, the system handles a key for decrypting the contents data thus encrypted (which will be referred to as "contents key" hereafter) and the data (which will be referred to as "license data") including information (which will be referred to as "user agreement" hereafter) regarding control for reproduction of the contents, and control for the usage, transmission, and duplication of the license, thereby enabling input/output using the aforementioned secure function. This enables input/output of data in a simple manner while maintaining sufficient tamper-resistant function, thereby enabling high-speed processing with reduced power consumption. Note that the license data includes a license ID for identifying the license data, and so forth, as well as the contents key and the user agreement.

Of commands issued by the host device such as the recording device 100, the reproducing device 300, and so forth, to the storage device 200, the expanded commands for the secure function will be referred to as "secure commands" hereafter. On the other hand, the other commands will also be referred to as "ordinary commands" hereafter.

Figure 2:
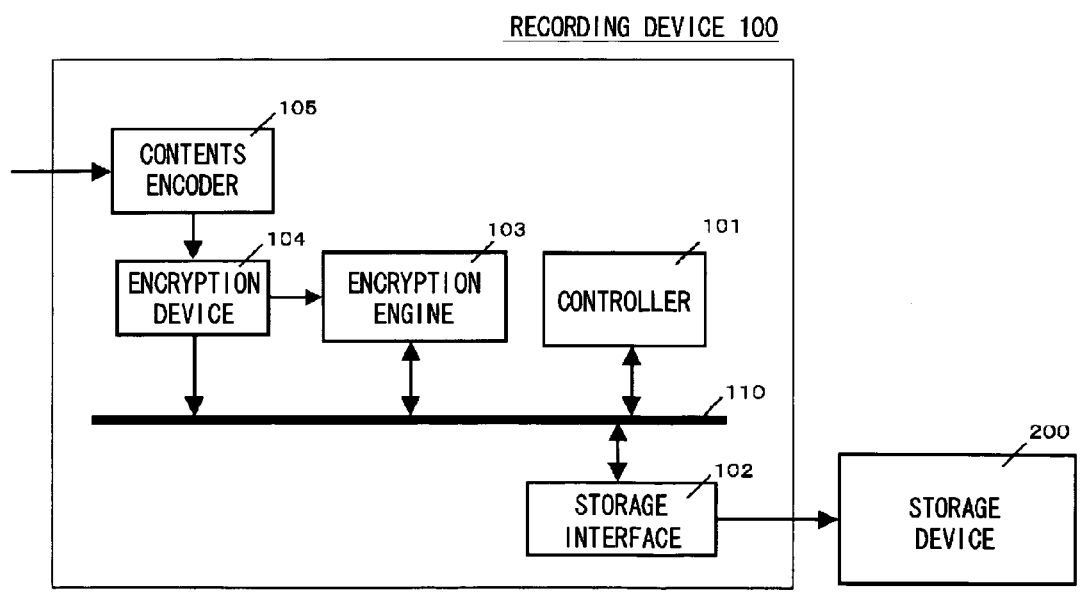
FIG. 2 is a diagram which shows an internal configuration of a recording device according to the first embodiment.

FIG. 2 shows an internal configuration of the recording device 100 according to an embodiment. Such a configuration may be realized by hardware means, e.g., by actions of a CPU, memory, and other LSIs, of a computer, and by software means, e.g., by actions of a program or the like, loaded to the memory. Here, the drawing shows a functional block configuration which is realized by cooperation of the hardware components and software components. It is needless to say that such a functional block configuration can be realized by hardware components alone, software components alone, or various combinations thereof, which can be readily conceived by those skilled in this art.

The recording device 100 principally includes a controller 101, a storage interface 102, an encryption engine 103, an encryption device 104, a contents encoder 105, and a data bus 110 for electrically connecting these components to each other.

The contents encoder 105 encodes the contents data acquired either on-line or off-line in a predetermined format. With the present embodiment, video data acquired from broadcast airwaves or the like is encoded in the MPEG format.

The encryption device 104 issues license data LIC containing a contents key for decrypting encrypted contents. The contents encoder 105 encrypts the contents data, which has been encoded by the contents encoder 105, using the contents key. The encrypted contents data is stored in the storage device 200 through the data bus 100 and the storage interface 102. Note that the encryption engine 103 is notified of the license data LIC thus issued, and the license data LIC is stored in the storage device 200 through the encryption engine 103.

The encryption engine 103 controls encrypted communication between the recording device 100 and the storage device 200, thereby allowing input of the license data LIC to the storage device 200. The storage interface 102 controls input/output of data to/from the storage device 200. The controller 101 centrally controls the components of the recording device 100.

Figure 3:
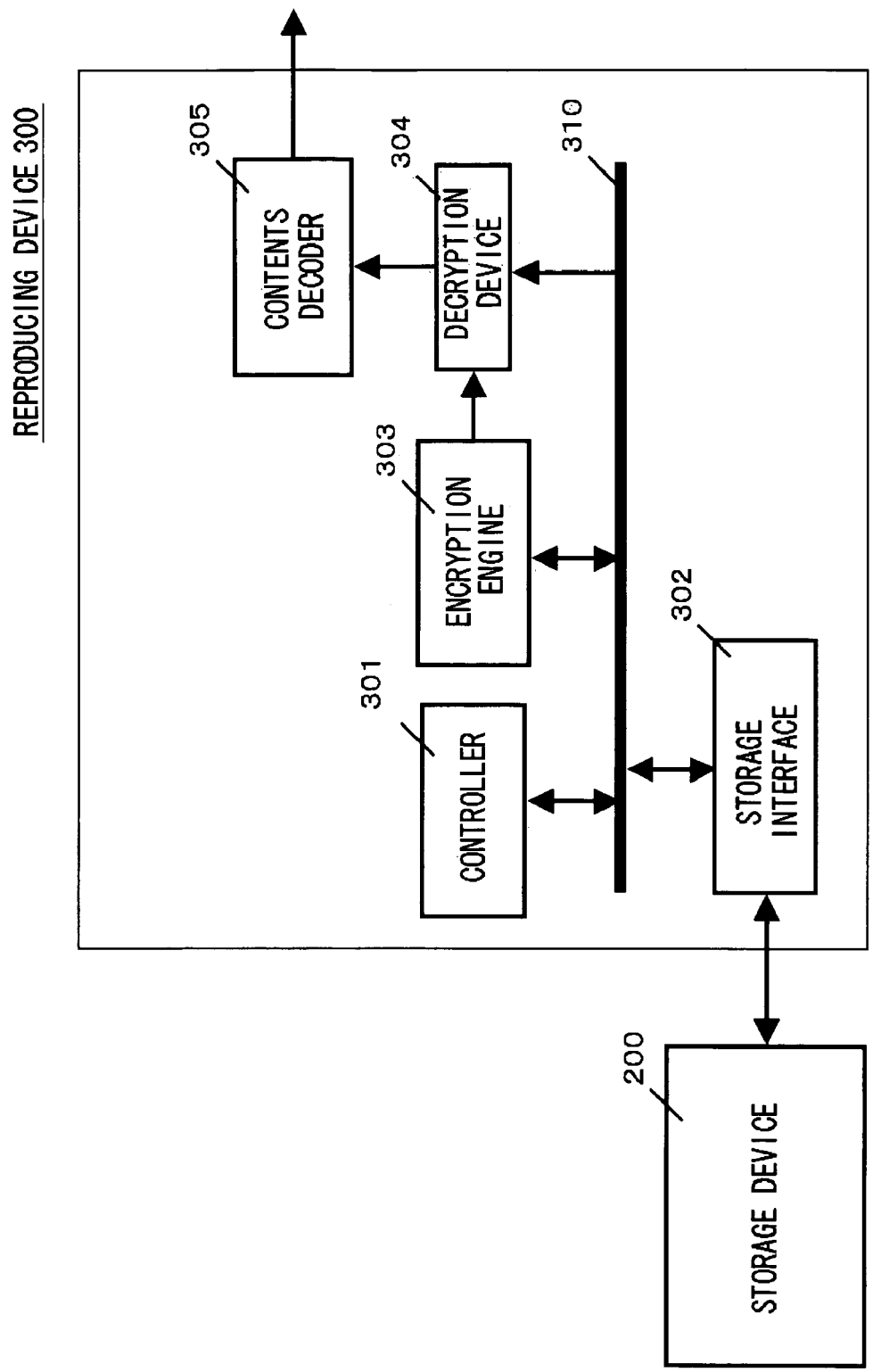
FIG. 3 is a diagram which shows an internal configuration of a reproducing device according to the first embodiment.

FIG. 3 shows an internal configuration of the reproducing device 300 according to the present embodiment. The aforementioned functional block configuration can be realized by hardware components alone, software components alone, or various combinations thereof.

The reproducing device 300 principally includes a controller 301, a storage interface 302, an encryption engine 303, a decryption device 304, a contents decoder 305, and a data bus 310 for connecting these components to each other.

The storage interface 302 controls input/output of data to/from the storage device 200. The encryption engine 303 controls encrypted communication between the storage device 200 and the reproducing device 300, thereby enabling reception of the license data, LIC containing the contents key from the storage device 200.

The decryption device 304 decrypts the encrypted contents data read out from the storage device 200 using the contents key contained in the license data LIC received from the storage device 200.

The contents decoder 305 decodes the contents data decrypted by the decryption device 304, and outputs the decoded contents data. Let us say that the contents data is decoded in the MPEG format. In this case, the contents decoder 305 reproduces the video signal and the audio signal from the contents data. The video signal thus reproduced is displayed on an unshown display device. On the other hand, the audio signal thus reproduced is output to an unshown speaker. The controller 301 centrally controls the components of the reproducing device 300.

Figure 4:
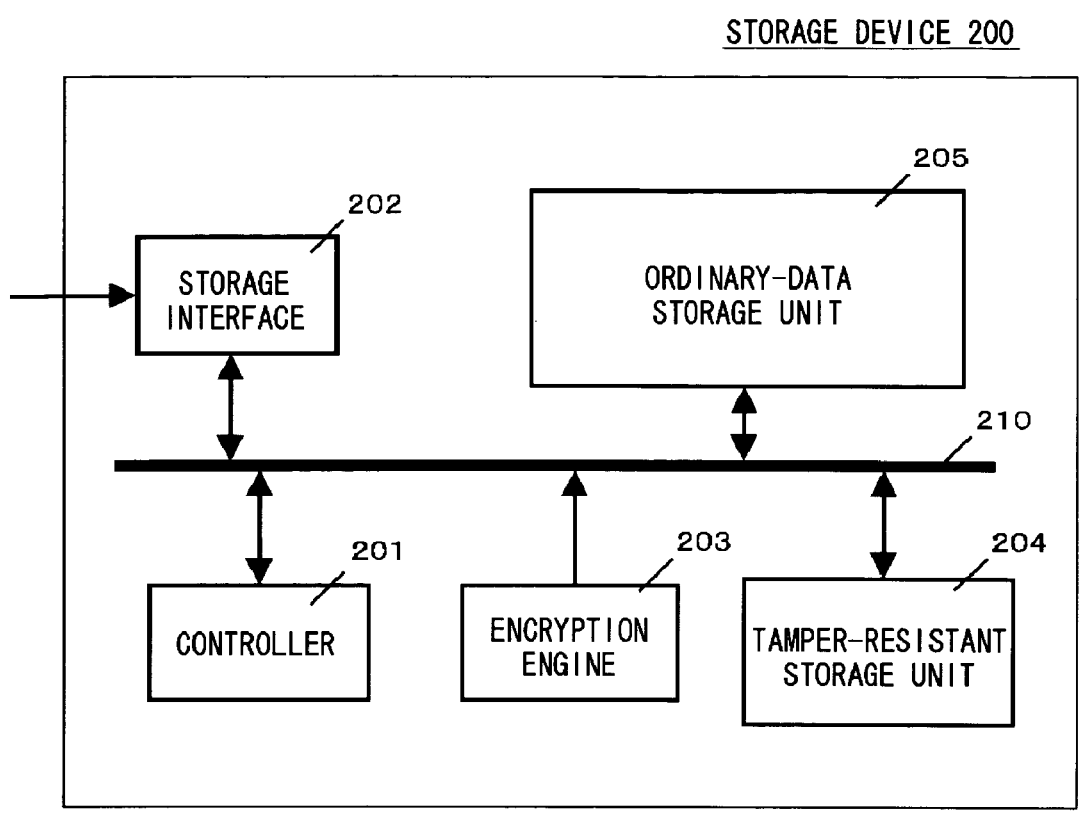
FIG. 4 is a diagram which shows an internal configuration of a storage device according to the first embodiment.

FIG. 4 shows an internal configuration of the storage device 200 according to the present embodiment. The storage device 200 principally includes a controller 200, a storage interface 202, an encryption engine 203, a tamper-resistant storage unit 204, an ordinary-data storage unit 205, and a data bus 210 for connecting these components to each other.

The storage interface 202 controls input/output of data to/from the storage device 100 and the reproducing device 300. The encryption engine 203 controls encrypted communication between: the storage device 200; and the recording device 100 and the reproducing device 300, thereby enabling input/output of confidential data such as the license data LIC containing the contents key to/from the recording device 100 and the reproducing device 300. The ordinary-data storage unit 205 serves as an ordinary-data storage area for storing the encrypted contents data, ordinary data, and so forth. On the other hand, the tamper-resistant storage unit 204 serves as a confidential-data storage area for storing confidential data such as the license data LIC containing the contents key. The controller 201 centrally controls these components of the storage device 200. The ordinary-data storage unit 205 has a configuration which allows direct access from external circuits (input/output of data). On the other hand, the tamper-resistant storage unit 204 has a configuration which does not allow access from external circuits (input/output of data), except through the encryption engine 203.

Now, description will be made regarding the keys employed in the present embodiment. In the present embodiment, all the keys are represented by text strings beginning with a capital K.

Furthermore, a symmetric key (shared key) is represented by a text string in which the second letter is a lowercase "c" or "s". More specifically, a challenge key is represented by a text string in which the second letter is a lowercase "c". Note that the challenge key is a temporary symmetric key created by a transmitter of encrypted data. Also, a session key is represented by a text string in which the second letter is a lowercase "s". Note that the session key is a temporary symmetric key created by a receiver of encrypted data.

On the other hand, a public key is represented by a text string in which the second letter is a capital "P". Also, a private key forming a pair along with the public key is represented by a text string in which the second letter, i.e., the capital "P" is stripped from the text string representing the public key.

Furthermore, the key for each device group is represented by a text string containing a lowercase "d". The key for each device is represented by a text string containing a lowercase "p". Each of these keys is prepared in the form of a pair of a public key and a private key. Note that the public key for each group is provided in the form of a public key certificate including a digital signature.

On the other hand, the last letter of each text string which represents the corresponding key, e.g., the numeral "2" in the text string KPd2 representing a public key, serves as an index for identifying the encryption engine from which the key has been provided. In the present embodiment, a key provided by a specified encryption engine is represented by a text string in which the last letter is a numeral "1", "2", "3", or the like. On the other hand, the keys provided by unspecified components other than the aforementioned encryption engines are represented by text strings in which the last letter is a letter of the English alphabet such as "x", "y", and so forth. In the present embodiment, the key provided by the encryption engine 103 of the recording device 100 is represented by the index numeral "1". The key provided by the encryption engine 203 of the storage device 200 is represented by the index numeral "2". The key provided by the encryption engine 303 of the reproducing device 300 is represented by the index numeral "3".

Now, description will be made regarding an cryptosystem employed in the present embodiment. While two types of the cryptosystems, i.e., the public key cryptosystem and the symmetric key cryptosystem, the present embodiment employs an cryptosystem using the public key cryptosystem and an cryptosystem using the symmetric key cryptosystem.

With the public key cryptosystem, encryption and decryption are made using different keys. Here, the key for encrypting the data will be referred to as "public key". On the other hand, the key for decrypting the data will be referred to as "private key". There is an implication of "the key available for publicity", i.e., "the key having no need to be managed in secret" in the term "public key". On the other hand, the private key is managed in private.

Examples of algorithms employed in the public key cryptosystem include RSA, EC-DH (Elliptic Curve Diffie-Hellman), and so forth. With the present embodiment, the EC-DH algorithm is employed. With the EC-DH, data is encrypted with a symmetric key (which is also referred to as "shared key") shared between the transmitter and the receiver, using multiplication on an elliptic curve on an infinite field (The encryption algorithm will be referred to as "elliptic curve encryption algorithm"). In this case, the encrypted data has a data structure in which two data components are linked. One is encrypted data (encryption results). The other is the data (which will be referred to as "parameter") used for sharing of the shared key between the transmitter and the receiver.

Now, description will be made regarding transmission of encrypted data using a public key KPdx and a private key Kdx. With the EC-DH, the relation between the public key KPdx and the private key Pdx is represented by Expression, KPdx=Kdx*B. Here, "B" represents the base point on the elliptic curve, and an asterisk "*" represents multiplication on the elliptic curve. Note that description will be made regarding an arrangement with a device receiving encrypted data (which will be referred to as "receiver") as "x", and with another device providing the encrypted data (which will be referred to as "transmitter") as "y".

First, the receiver transmits a public key KPdx to the transmitter. Upon the transmitter receiving the public key KPdx, the transmitter generates a random number rdy for creating encrypted data. Then, the transmitter multiplies the public key KPdx by the random number rdy on the elliptic curve, thereby computing a shared key KPdx*rdy. At the same time, the transmitter computes a parameter B*rdy for sharing the shared key KPdx*rdy between the transmitter and the receiver. Note that the base point B and the equation of the elliptic curve are shared between the transmitter and the receiver beforehand.

Then, data (which will be referred to as "Data"), which is to be encrypted, is encrypted using the shared key KPdx*rdy thus created, thereby creating encrypted data Es(KPdx*rdy, Data). Subsequently, the transmitter links the parameter B*rdy and the encrypted data Es(KPdx*rdy, Data), thereby creating the linked result (B*rdy)//Es(KPdx*rdy, Data). The linked result (B*rdy)//Es (KPdx*rdy, Data) thus obtained is transmitted to the receiver as Ep(KPdx, Data).

Here, the symbol "//" represents linking of the data. For example, Expression B*rdy//Es(KPdx*rdy, Data) represents a data sequence in which the parameter B*rdy and the encrypted data Es(KPdx*rdy, Data) are linked serially. Also, the symbol "Es" represents an encryption function based upon the symmetric-key cryptosystem. For example, Expression Es(KPdx*rdy, Data) represents the encrypted data in which Data, which is to be encrypted, is encrypted using the symmetric key KPdx*rdy. Also, the symbol "Ep" represents an encryption function based upon the public-key cryptosystem. For example, Expression Ep(KPdx, Data) represents encrypted data in which Data, which is to be encrypted, is encrypted using the public key KPdx.

As described above, with the EC-DH, Ep(KPdx, Data) is represented by B*rdy//Es(KPdx*rdy, Data).

Upon the receiver receiving Ep(KPdx, Data), the receiver multiplies the parameter B*rdy by the private key Kdx stored therein on the elliptic curve, thereby obtaining the shared key Kdx*B*rdy=KPdx*rdy. Then, the receiver decrypts the encrypted data Es(KPdx*rdy, Data) using the shared key KPdx*rdy thus obtained. The same can be said of the relation between the public key KPpx and the private key Kpx.

With the symmetric-key cryptosystem, encryption and decryption are made using the same key. Examples of the symmetric-key cryptosystems include: DES (Data Encryption Standard), AES (Advanced Encryption Standard), and so forth. While any algorithm may be employed in the symmetric-key cryptosystem according to the present embodiment, AES is employed in the present embodiment giving consideration a balance between ease-of-use of a combination with the aforementioned public key cryptosystem and the encryption level thereof.

Figure 5:
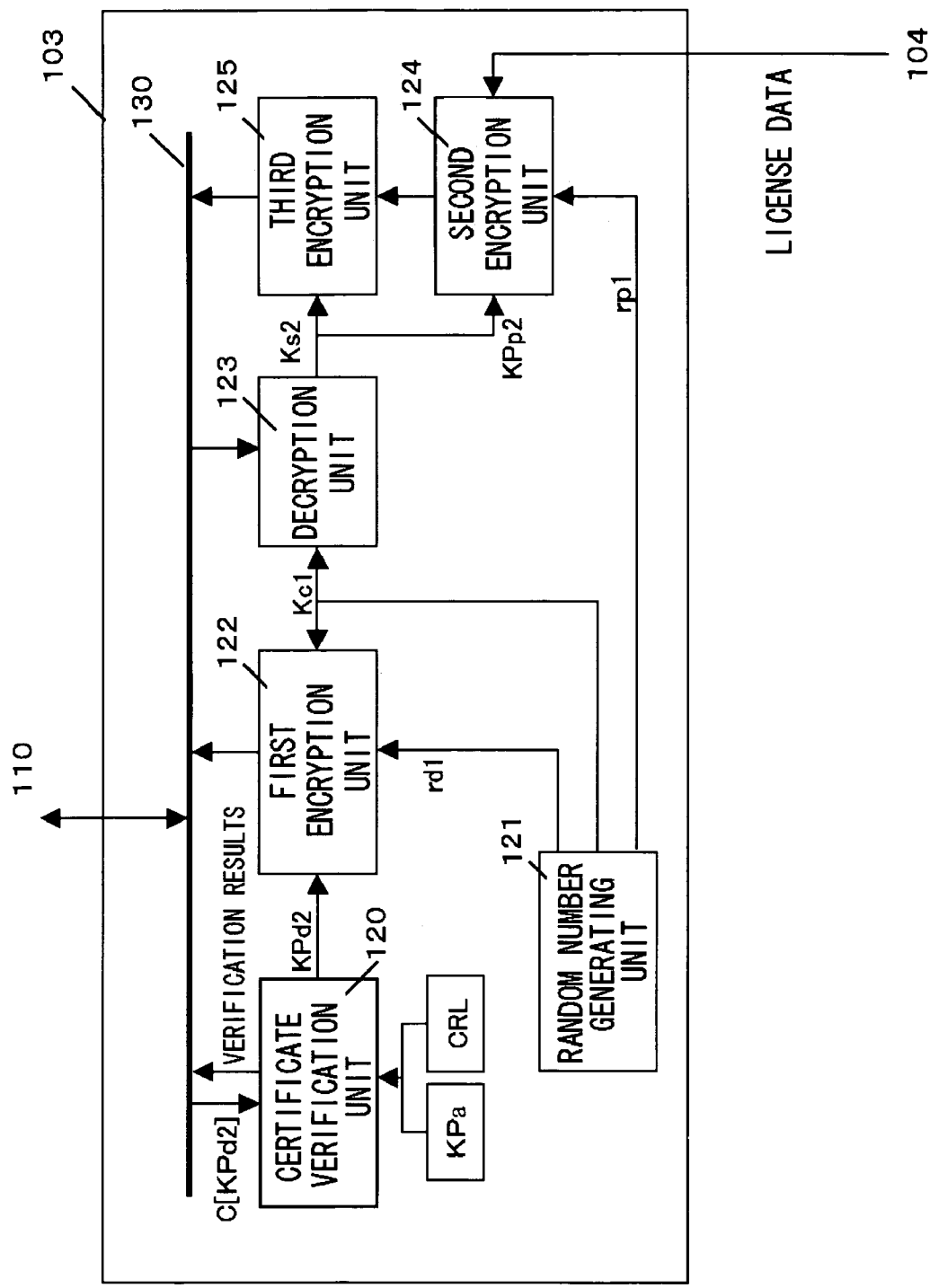
FIG. 5 is a diagram which shows an internal configuration of an encryption engine shown in FIG. 2.

FIG. 5 shows an internal configuration of the encryption engine 103 of the recording device 100 shown in FIG. 2. The encryption engine 103 includes a certification verification unit 120, a random number generating unit 121, a first encryption unit 122, a decryption unit 123, a second encryption unit 124, a third encryption unit 125, and a local bus 130 for connecting at least a part of these components to each other.

The certificate verification unit 120 verifies the certificate C[KPd2] acquired from the storage device 200. The certificate C[KPd2] is formed of unencrypted information (which will be referred to as "certificate body" hereafter) containing the public key KPd2, and a digital signature appended to the certificate body. The digital signature is created as follows. That is to say, first, the certificate body is subjected to computation using the hash function (which will be referred to as "hash computation" hereafter). Next, the computation result thus obtained is encrypted using a root key Ka held by the Certificate Authority (not shown) which is a third party organization, thereby creating the digital signature. Note that the root key Ka is a non-public key which is strictly managed by the Certificate Authority. That is to say, the root key Ka is a private key of the Certificate Authority. The certificate verification unit 120 holds a verification key KPa corresponding to the root key Ka; these two keys forming a key pair. The verification key KPa is a public key for verifying the validity of the certificate.

The verification of the certificate is made based upon the validity of the certificate, which is to say that the certificate has not been forged, and that the certificate has not been revoked. That the certificate is not unauthorized is confirmed based upon comparison results between: the computation result obtained by performing hash function computation for the certificate body of the certificate which is to be verified; and the computation result obtained by decrypting the digital signature using the verification key KPa. In a case that these results match one another, the certificate verification unit 120 determines that the certificate is valid. Furthermore, the certificate verification unit 120 holds a certification revocation list which is a list of revoked certificates which accordingly have been invalidated. In a case that determination has been made that the certificate which is to be verified is not listed in the CRL, the certificate verification unit 120 determines that the certificate is valid. In the present embodiment, such processing, in which a certificate is authenticated and authorized based upon the validity of the certificate, will be referred to as "verification".

Upon success of verification, the certificate verification unit 120 acquires the public key KPd2 of the storage device 200. Then, the certificate verification unit 120 transmits the public key KPd2 to the first encryption unit 122, as well as making notification of the verification results. In a case of failure in verification, the certificate verification unit 120 outputs a verification error notification.

The random number generating unit 121 generates a random number or pseudorandom number. Hereinafter, a random number and a pseudorandom number are collectively called a random number. Specifically, the random number generating unit 121 generates challenge keys Kc1 and random numbers rd1 and rp1 temporarily used for encrypted communication between the recording device 100 and the storage device 200. The random number generating unit 121 generates the challenge key Kc1, which is a random number, each time that encrypted communication is performed, thereby minimizing the risk of the challenge key being cracked. The generated challenge key Kc1 is transmitted to the first encryption unit 122 and the decryption unit 123. On the other hand, the random numbers rd1 and rp1 thus generated are transmitted to the first encryption unit 122 and the second encryption unit 124 for making encryption based upon ED-DH.

In order to notify the storage device 200 of the challenge key Kc1, the first encryption unit 122 encrypts the challenge key Kc1 using the public key KPd2 of the storage device 200 acquired by the certificate verification unit 120, thereby creating an encrypted challenge key Ep(KPd2, Kc1)=B*rd1//Es(KPd2*rd1, Kc1). That is to say, encryption is made using the random number rd1 generated by the random number generating unit 121.

The decryption unit 123 decrypts the encrypted data using the challenge key Kc1. A session key Ks2 issued by the storage device 200 and a public key KPp2 of the storage device 200 are supplied from the storage device 200 in the form of session information Es(Kc1, Ks2//KPp2). With the present embodiment, the decryption unit 123 decrypts the session information Es(Kc1, Ks2//KPp2) using the challenge key Kc1 generated by the random number generating unit 121, thereby acquiring the session key Ks2 and the public key KPp2. The public key KPp2 and the session key Ks2 thus acquired are transmitted to the second encryption unit 124 and the third encryption unit 125, respectively.

The second encryption unit 124 acquires the license data LIC containing the contents key issued in the processing in which the encryption device 104 encrypts the contents. Then, the second encryption unit 124 encrypts the license data LIC using the public key KPp2 of the license-data receiver, i.e., the storage device 200, thereby creating encrypted license data LIC Ep(KPp2, LIC)=B*rp1//Es(KPp2*rp1, LIC). That is to say, this encryption is made using the random number rp1 generated by the random generating unit 121. Then, the encrypted license data Ep(KPp2, LIC) thus created is transmitted to the third encryption unit 125.

The third encryption unit 125 further encrypts Ep(KPp2, LIC), which has been created by the second encryption unit 124, using the session key Ks2 issued by the storage device 200, thereby creating encrypted license data Es(Ks2, Ep(KPp2, LIC).

As shown in FIG. 5, of the components forming the encryption engine 103, the certificate verification unit 120, the first encryption unit 122, the decryption unit 123, and the third encryption unit 125, are electrically connected with each other through the local bus 130, and are further connected to the data bus 110 of the recording device 100 through the local bus 130. While various modifications may be made for connecting these components, connection of these components according to the present embodiment is designed such that the challenge key Kc1 and the random numbers rd1 and rp1, each of which is generated by the random generating unit 121, and the session key Ks2 received from the storage device 200 are not directly available on the data bus 110. This prevents leakage of each key used in the encryption engine 103 to external circuits through other components of the recording device 100, thereby improving security.

Figure 6:
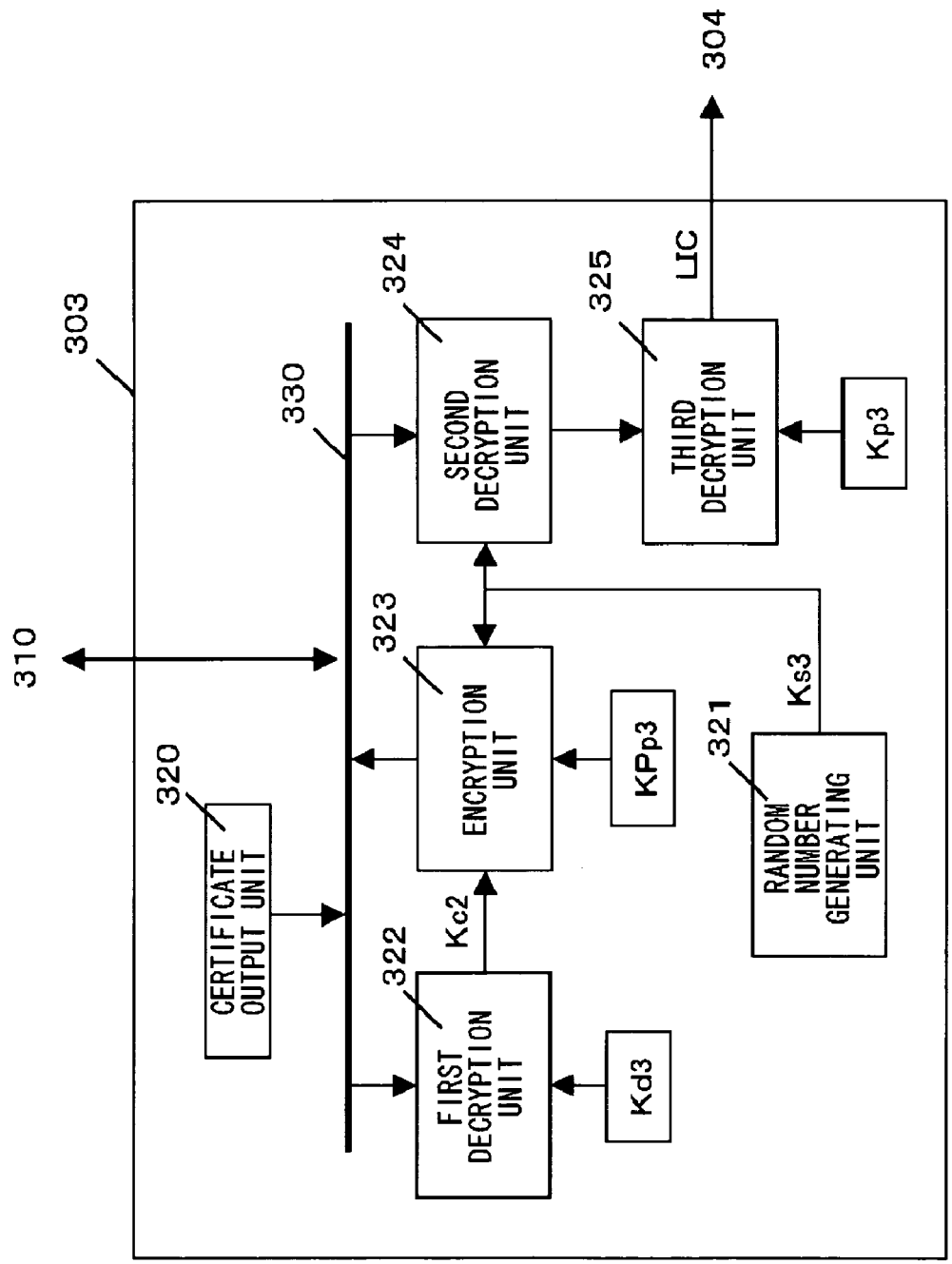
FIG. 6 is a diagram which shows an internal configuration of an encryption engine shown in FIG. 3.

FIG. 6 shows an internal configuration of the encryption engine 303 of the reproducing device 300 shown in FIG. 3. The encryption engine 303 includes: a certificate output unit 320, a random number generating unit 321, a first decryption unit 322, an encryption unit 323, a second decryption unit 324, a third decryption unit 325, and a local bus 330 for electrically connecting at least part of these components.

The certificate output unit 320 outputs a certificate C[KPd3] of the reproducing device 300. The certificate may be held by the certificate output unit 320. Also, an arrangement may be made in which an unshown certificate holding unit holds the certificate, and the certificate output unit 320 reads out the certificate from the certificate holding unit as necessary. The certificate is formed of the certificate body containing a public key KPd3 of the reproducing device 300 and a digital signature appended to the certificate body. The digital signature is encrypted using the root key Ka of the Certificate Authority in the same way as with the certificate of the storage device 200.

The random number generating unit 321 generates a session key Ks3 temporarily used for encrypted communication between the reproducing device 300 and the storage device 200. The created session key Ks3 is transmitted to the encryption unit 323 and the second decryption unit 324.

The first decryption unit 322 decrypts the data, which has been encrypted using the public key KPd3, using a private key Kd3. In reproduction processing, a challenge key Kc2 issued by the storage device 200 is supplied from the storage device 200 in the form of challenge information Ep(KPd3, Kc2) in which the challenge key Kc2 has been encrypted using the public key KPd3 of the reproducing device 300. With the present embodiment, the first decryption unit 322 decrypts the challenge information Ep(KPd3, Kc2) using the private key Kd3 thereof, thereby acquiring the challenge key Kc2. The challenge key Kc2 thus acquired is transmitted to the encryption unit 323.

The encryption unit 323 encrypts data using the challenge key Kc2 acquired by the first decryption unit 322. Specifically, the encryption unit 323 links the session key Ks3 issued by the random number generating unit 321 and the public key KPp3 of the reproducing device 300, and encrypts the linked key data, thereby creating session information Es(Kc2, Ks3//KPp3).

The second decryption unit 324 decrypts the encrypted data using the session key Ks3. Specifically, the license data is supplied from the storage device 200 in the form of encrypted license data Es(Ks3, Ep(KPp3, LIC)) in which the license data has been encrypted twofold using the public key KPp3 and the session key Ks3. With the present embodiment, the second decryption unit 324 decrypts the encrypted license data using the session key Ks3 issued by the random number generating unit 321, and transmits the decryption result to the third decryption unit 325.

The third decryption unit 325 decrypts the data which has been encrypted using the public key KPp3. That is to say, the third decryption unit 325 decrypts the decryption results transmitted from the second decryption unit 324, using the private key Kp3 corresponding to the public key KPp3; these keys forming a key pair. Thus, the license data LIC is acquired. The license data LIC thus acquired is transmitted to the decryption device 304. The decryption device 304 decrypts encrypted contents data using the contents key contained in the license data LIC.

While various modifications may be made for connecting these components of the encryption engine 303 shown in FIG. 6, connection of these components according to the present embodiment is designed such that the session key Ks3 generated by the random number generating unit 321, the private keys Kd3 and Kp3 each of which forms a key pair along with the corresponding public key, and the session key Ks2 received from the storage device 200, are not directly available on the data bus 310. This prevents leakage of the decryption keys used in the encryption engine 303 to external circuits.

Figure 7:
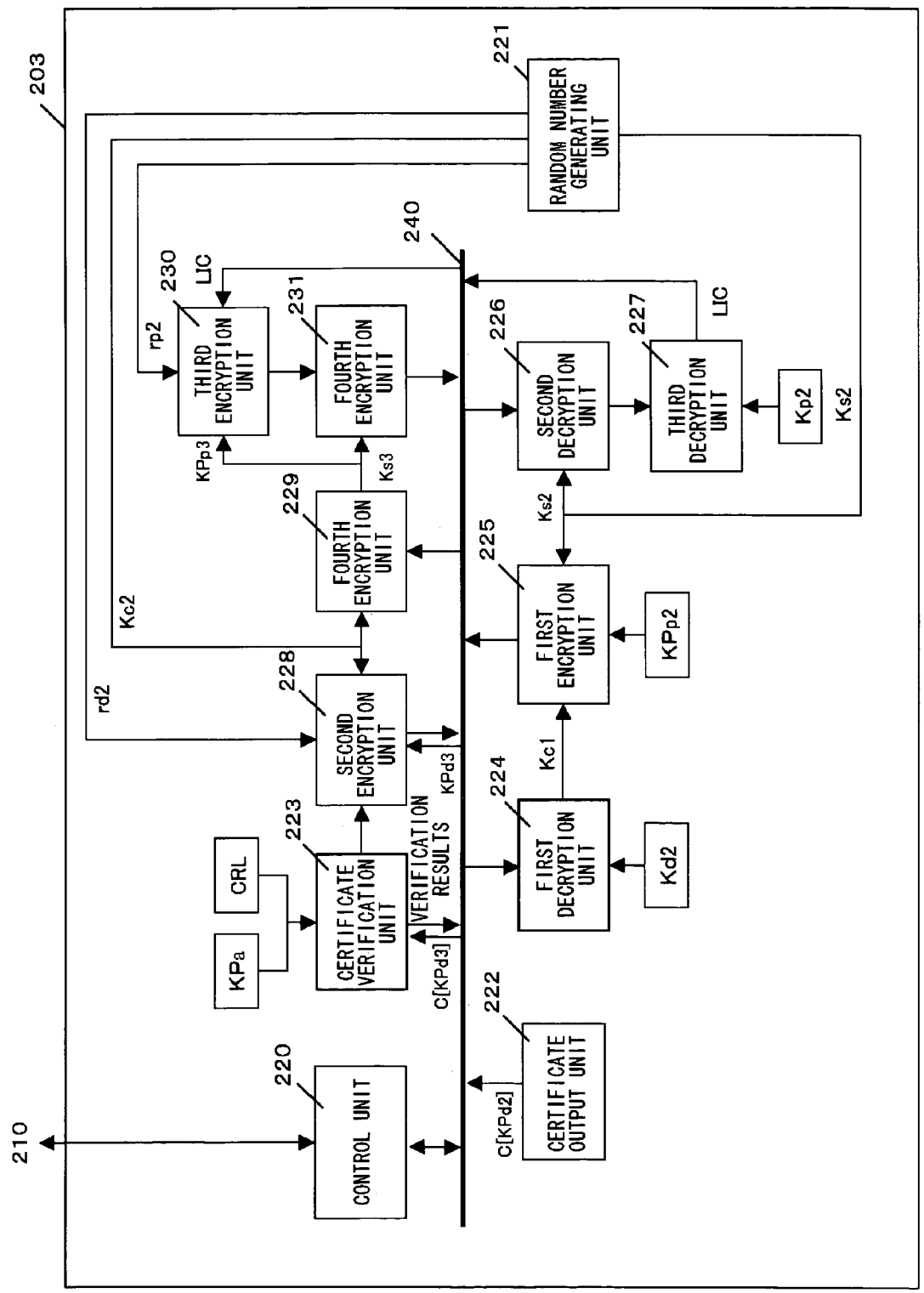
FIG. 7 is a diagram which shows an internal configuration of an encryption engine shown in FIG. 4.

FIG. 7 shows an internal configuration of the encryption engine 203 of the storage device 200 shown in FIG. 4. The aforementioned functional block configuration can also be realized by hardware components alone, software components alone, or various combinations thereof. With the present embodiment, the encryption engine 203 includes a control unit 220, a random number generating unit 221, a certificate output unit 222, a certificate verification unit 223, a first decryption unit 224, a first encryption unit 225, a second decryption unit 226, a third decryption unit 227, a second encryption unit 228, a fourth decryption unit 229, a third encryption unit 230, a fourth encryption unit 231, and a local bus 240 for electrically connecting at least a part of these components.

The control unit 220 controls the internal components of the encryption engine 203 and controls input/output of data to/from external components according to instructions from the controller 201 of the storage device 200.

The random number generating unit 221 generates the random numbers rd2 and rp2, the session key Ks2, and the challenge key Kc2, using random-number generation, each of which is temporarily used for encrypted communication between the storage device 200 and either of the recording device 100 or the reproducing device 300. Specifically, in a case that the storage device 200 provides the license data, the random number generating unit 221 generates the random numbers rd2 and rp2, and the challenge key Kc2. On the other hand, in a case that the storage device 200 receives the license data, the random number generating unit 211 generates the session key ks2.

The certificate output unit 222 outputs the certificate C[KPd2] of the storage device 200. The certificate may be held by the certificate output unit 222. Also, an arrangement may be made in which the certificate is stored in a predetermined storage area in the storage device 200, e.g., the tamper-resistant storage unit 204, and the certificate output unit 222 reads out the certificate therefrom as necessary. The certificate is formed of the certificate body containing a public key KPd2 of the storage device 200 and a digital signature appended to the certificate body. The digital signature is encrypted using the root key Ka of the Certificate Authority.

The certificate verification unit 223 verifies the certificate provided from external components. Specifically, the certificate verification unit 223 verifies the certificate C[KPd1] acquired from the recording device 100 and the certificate C[KPd3] received from the reproducing device 300 using the verification key KPa. Note that detailed description has been made regarding verification processing, and accordingly, description thereof will be omitted.

The first decryption unit 224 decrypts the data, which has been encrypted using the public key KPd2 of the storage unit 200. Specifically, in a case of recording the data, the challenge key Kc1 issued by the recording device 100 is supplied from the recording device 100 in the form of challenge information Ep(KPd2, Kc1)=B*rd1//Es(KPd2*rd1, Kc1) in which the challenge key Kc1 has been encrypted using the public key KPd2. With the present embodiment, the first decryption unit 224 decrypts the challenge information using the private key Kd2 of the storage device 200, thereby acquiring the challenge key Kc1. The challenge key Kc1 thus acquired is transmitted to the first encryption unit 225.

The first encryption unit 225 encrypts data using the challenge key Kc1 issued by the recording device 100. Specifically, the first encryption unit 225 links the session key Ks2 generated by the random number generating unit 221 and the public key KPp2 of the storage device 200, and encrypts the linked key data using the challenge key Kc1. Thus, the first encryption unit 225 creates session information Es(Kc1, Ks2//KPp2).

The second decryption unit 226 decrypts the encrypted data using the session key Ks2 generated by the random number generating unit 221. Specifically, the second decryption unit 226 receives the license data LIC from the recording device 100 in the form of encrypted license data Es(Ks2, Ep(KPp2, LIC)) in which the license data has been encrypted twofold using the public key KPp2 and the session key Ks2. With the present embodiment, the second decryption unit 226 decrypts the encrypted license data using the session key Ks2, and transmits the decryption results to the third decryption unit 227.

The third decryption unit 227 decrypts the data which has been encrypted using the public key KPp2 of the storage device 200. Specifically, the third decryption unit 227 decrypts the encrypted license data Ep(KPp2, LIC)=B*rp1//Es(KPp2*rp1, LIC) in which the license data LIC has been encrypted using the public key KPp2 supplied from the second decryption unit 226, using the private key Kp2 of the storage device 200 forming a pair along with the public key KPp2, thereby acquiring the license data LIC.

The license data LIC thus acquired is supplied to the data bus 210 through the local bus 240 and the control unit 220, and stored in the tamper-resistant storage unit 204 according to instructions from the controller 201.

The second encryption unit 228 encrypts the data using the public key KPd3 of the reproducing device 300. Specifically, in a case of supplying the license data to the reproducing device 300, the second encryption unit 228 encrypts the challenge key Kc2, which has been generated by the random number generating unit 221, using the public key KPd3 acquired from the certificate C[KPd3] received from the reproducing device 300. Thus, the second encryption unit 228 creates challenge information Ep(KPd3, Kc2)=B*rd2//Es(KPd3*rd2, Kc2). That is to say, this encryption is made using the random number rd2 generated by the random number generating unit 221. The encrypted challenge key Ep(KPd3, Kc2) thus created is transmitted to the control unit 220 through the local bus 240.

The fourth decryption unit 229 decrypts the data using the challenge key Kc2 generated by the random number generating unit 221. Specifically, the fourth decryption unit 229 decrypts the session information E(Kc2, Ks3//KPp3) received from the reproducing device 300, using the challenge key Kc2 generated by the random number generating unit 221, thereby acquiring the session key Ks3 and the public key KPp3 of the reproducing device 300. The session key Ks3 and the public key KPp3 thus acquired are transmitted to the fourth encryption unit 231 and the third encryption unit 230, respectively.

The third encryption unit 230 encrypts the data using the public key KPp3 of the reproducing device 300. In a case of supplying the license data to the reproducing device 300, the third encryption unit 230 encrypts the license data LIC using the public key KPp3 received from the reproducing device 300, thereby creating encrypted license data Ep(KPp3, LIC)=B*rp2//Es(KPp3*rp2, LIC). Note that the license data is read out from the tamper-resistant storage unit 204 according to instructions from the controller 201, and is supplied to the third encryption unit 230 through the data bus 210, the control unit 220, and the local bus 240. This encryption is made using the random number rp2 generated by the random number generating unit 221.

The fourth encryption unit 231 encrypts the data using the session key Ks3 issued by the reproducing device 300. Specifically, the fourth encryption unit 231 further encrypts the encrypted license data, which has been encrypted by the third encryption unit 230 using the public key KPp3 of the reproducing device 300, using the session key Ks3. Thus, the fourth encryption unit 231 creates encrypted license data Es(Ks3, Ep(KPp3, LIC)).

Figure 8:
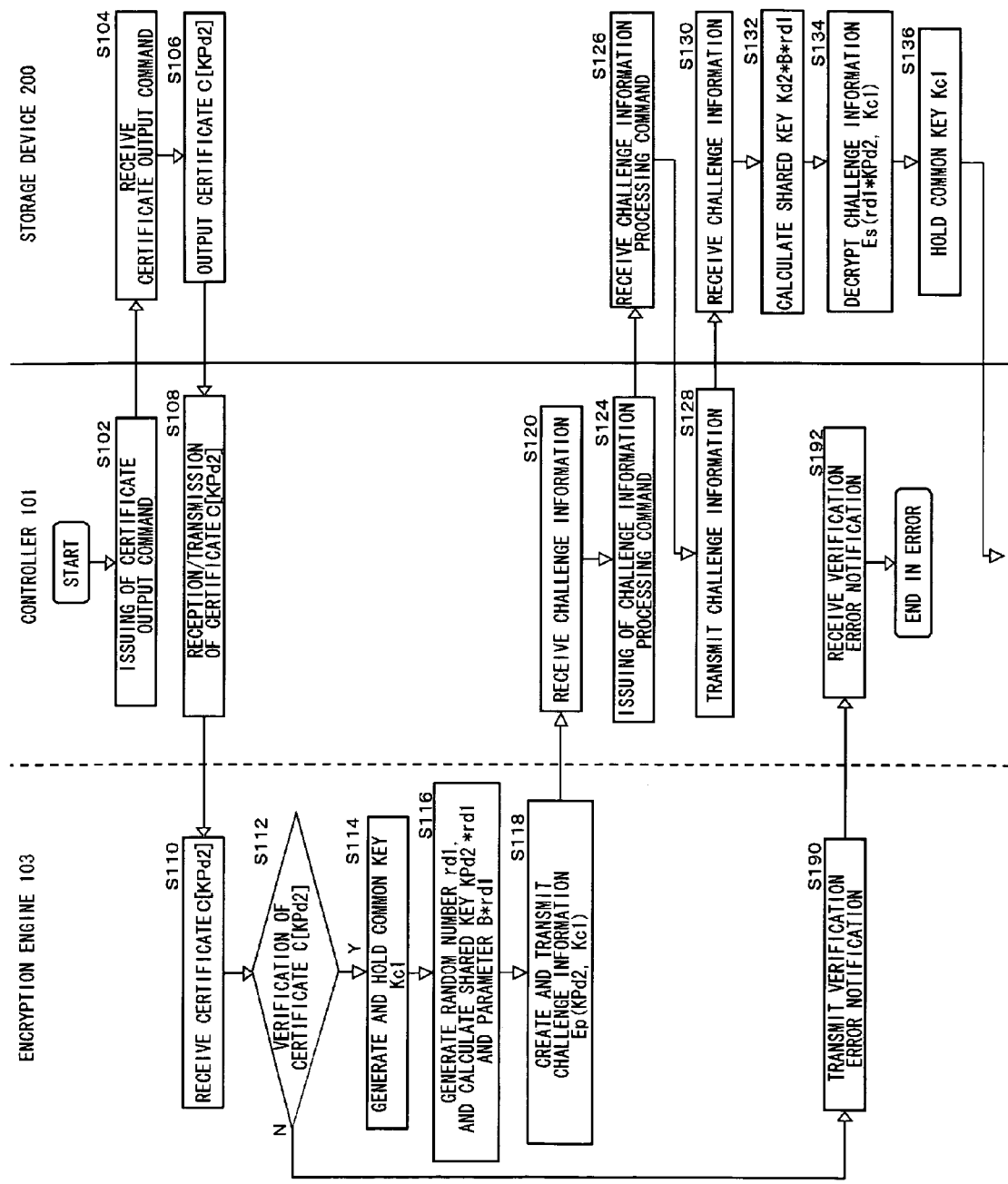
FIG. 8 is a diagram which shows a procedure up to a step in which the recording device stored license data in the storage device.
Figure 9:
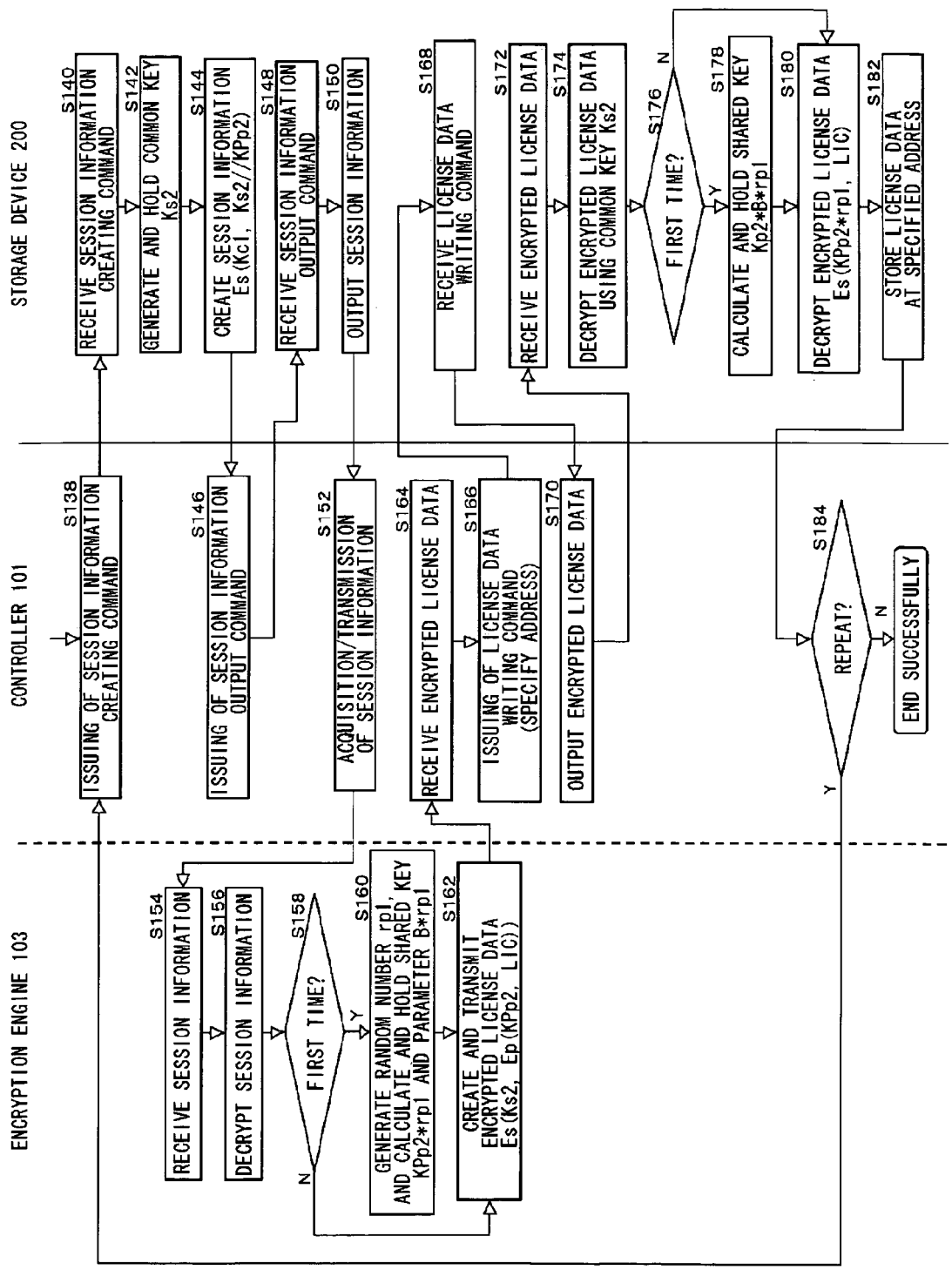
FIG. 9 is a diagram which shows a procedure up to a step in which the recording device stores license data in the storage device.

FIGS. 8 and 9 show the procedure up to a step in which the recording device 100 records the license data LIC on the storage device 200.

First, the controller 101 of the recording device 100 issues a certificate output command to the storage device 200 (S102). Upon successful reception of the certificate output command (S104), the controller 201 of the storage device 200 instructs the encryption engine 203 to output the certificate. Then, the controller 201 outputs the certificate C[KPd2] thus read out, to the recording device 100 (S106).

Upon reception of the certificate C[KPd2] from the storage device 200, the controller 101 transmits the certificate to the encryption engine 103 of the recording device 100 (S108). Upon the encryption engine 103 receiving the certificate C[KPd2] of the storage device 200 (S110), the certificate verification unit 120 verifies the certificate using the verification key KPa (S112). In a case that the certificate has not been authenticated (in a case of "NO" in S112), the certificate verification unit 120 transmits a verification-error notification to the controller 101 (S190). In a case that the controller 101 has received an error notification (S192), the processing ends in error.

In a case that the certificate has been authenticated (in a case of "YES" in S112), the encryption engine 103 generates the challenge key Kc1 by actions of the random number generating unit 121, and transmits the challenge key Kc1 thus generated, to the first encryption unit 122 and the decryption unit 123. The decryption unit 123 holds the challenge key Kc1 therein (S114). Furthermore, the random number generating unit 121 generates the random number rd1, and transmits the random number rd1 thus generated, to the first encryption unit 122. The first encryption unit 122 computes the shared key KPd2*rd1 and the parameter B*rd1 using the random number rd1 (S116). The encryption engine 103 encrypts the challenge key Kc1 using the shared key KPd2*rd1, thereby creating the challenge information Ep(KPd2, Kc1)=B*rd1//Es(KPd2*rd1, Kc1). The challenge information thus created is transmitted to the controller 101 (S118).

Upon reception of the challenge information Ep(KPd2, Kc1) (S120), the controller 101 issues a challenge information processing command to the storage device 200 (S124) Upon the controller 201 of the storage device 200 receiving the challenge information processing command, the storage device 200 makes a request of input of the challenge information Ep(KPd2, Kc1) (S126). In response to the request, the controller 101 of the recording device 100 outputs the challenge information Ep(KPd2, Kc1) to the storage device 200 (S128).

Upon the storage device 200 receiving the challenge information Ep(KPd2, Kc1) (S130), in the encryption engine 203, the first decryption unit 224 separates the challenge information Ep(KPd2, Kc1) into the parameter B*rd1 and the encrypted challenge key Es (KPd2*rd1, Kc1). Then, the first decryption unit 224 computes the shared key Kd2*B*rd1 (=KPd2*rd1) using the parameter B*rd1 and the private key Kd2 of the storage device 200 (S132), and decrypts the encrypted challenge key Es(KPd2*rd1, Kc1), thereby acquiring the challenge key Kc1 (S134). The challenge key Kc1 thus acquired by the first decryption unit 224 is held by the first encryption unit 225 (S136).

On the other hand, upon completion of the processing instructed by the challenge information processing command in the storage device 200, the controller 101 of the recording device 100 issues a session information creating command to the storage device 200 (S138). Upon the controller 201 of the storage device 200 receiving the session information creating command (S140), the random number generating unit 221 generates the session key Ks2 according to instructions from the control unit 220 in the encryption engine 203 of the storage device 200. The session key Ks2 thus generated is transmitted to the second decryption unit 226 and the first encryption unit 225. Note that the second decryption unit 226 holds the session key Ks2 thus received (S142). The first encryption unit 225 links the session key Ks2 and the public key KPp2 of the storage device 200, and encrypts the linked key data using the challenge key Kc1 held in Step S136, thereby creating session information Es(Kc1, Ks2//KPp2) (S144).

On the other hand, upon completion of the processing instructed by the session information creating command in the storage device 200, the controller 101 of the recording device 100 issues a session information output command (S146). Upon the storage device 200 receiving the session information output command (S148), the controller 201 reads out the second session information Es(Kc1, Ks2//KPp2) from the encryption engine 203, and outputs the second session information thus read out, to the controller 101 of the recording device 100 (S150).

Upon the controller 101 of the recording device 100 receiving the session information Es(Kc1, Ks2//KPp2) from the storage device 200, the controller 101 transmits the session information thus received, to the encryption engine 103 (S152). Upon the encryption engine 103 receiving the session information Es(Kc1, Ks2//KPp2) from the controller 101 (S154), the decryption unit 123 decrypts the session information Es(Kc1, Ks2//KPp2) using the challenge key Kc1 held in Step S114, thereby acquiring the session key Ks2 and the public key KPp2 of the storage device, 200 (S156). The session key Ks2 and the public key KPp2 thus acquired are transmitted to the third encryption unit 125 and the second encryption unit 124, respectively.

Subsequently, the encryption engine 103 determines whether or not the current license-data recording is the first recording after holding of the challenge key Kc1 in Step S114, or the second or subsequent recording thereof (S158). In a case that the current license-data recording is the first recording (in a case of "YES" in S158), the encryption engine 103 generates the random number rp1 by actions of the random number generating unit 121, and transmits the random number rp1 thus created, to the second encryption unit 124. The second encryption unit 124 computes the shared key KPp2*rp1 and the parameter B*rp1 using the random number rp1, and holds the shared key and the parameter therewithin (S160).

On the other hand, in a case that the current license-data recording is the second or subsequent recording (in a case of "NO" in S158), the flow skips the Step S160. That is to say, the flow proceeds to the following Step S162 without creating the shared key KPp2*rp1 and the parameter B*rp1.

The second encryption unit 124 encrypts the license data LIC issued by the encryption device 104 using the shared key KPp2*rp1, thereby creating encrypted license data Ep(KPp2, LIC)=B*rp1//Es(KPp2*rp1, LIC). The encrypted license data thus created is transmitted to the third encryption unit 125. Furthermore, the third encryption unit 125 further encrypts the encrypted license data Ep(KPp2, LIC), which has been created by the second encryption unit 124, using the session key Ks2, thereby creating encrypted license data Es(Ks2, Ep(KPp2, LIC)). The encrypted license data Es(Ks2, Ep(KPp2, LIC)) thus created is transmitted to the controller 101 (S162).

As described above, with the present embodiment, in a case that the current license-data recording is the first recording (in a case of "YES" in S158), the encryption engine 103 creates the shared key KPp2*rp1 and the parameter B*rp1 anew by making multiplication on an elliptic curve, i.e., by making encryption computation based upon the public key cryptosystem. Then, the flow proceeds to Step S162 where the encrypted license data Es(Ks2, Ep(KPp2, LIC)) is created using the shared key KPp2*rp1 and the parameter B*rp1 thus created anew. The encrypted license data Es(Ks2, Ep(KPp2, LIC)) thus created is transmitted to the controller 101.

On the other hand, in a case that the current license-data recording is the second or subsequent recording (in a case of "NO" in S158), the flow proceeds to Step S160 without creating a new shared key KPp2*rp1 and a new parameter B*rp1. In this case, the encryption engine 103 executes the processing in Step S162 using the shared key KPp2*rp1 and the parameter B*rp1 held by the second encryption unit 124, thereby creating the encrypted license data Es(Ks2, Ep(KPp2, LIC)). The encrypted license data thus created is transmitted to the controller 101. That is to say, in a case that the current license-data recording is the second or subsequent recording, the encryption engine 103 creates the encrypted license data Es(Ks2, Ep(KPp2, LIC)) without creating a new shared key KPp2*rp1 and a new parameter B*rp1. That is to say, data is encrypted without multiplication on an elliptic curve. In this case, the processing time is dependent upon the computation time of the symmetric-key encryption computation, thereby enabling high-speed computation. Thus, with the present embodiment, the second or subsequent encryption processing is performed at a higher processing speed than with the first processing involving multiplication on an elliptic curve.

Upon the controller 101 receiving the encrypted license data Es(Ks1, Ep(KPp2, LIC)) (S164), the controller 101 issues a license data writing command to the storage device 200 (S166). The license writing command includes an address for specifying the recording location in the tamper-resistant storage unit 204, and control information which indicates whether or not computation for a new shared key is to be made in decryption of the encrypted license data. Note that the address used here means "logical address". While the logical address does not directly specify the recording location in the tamper-resistant storage unit 204, the controller manages storage of data with the logical address, thereby allowing the user to read out the data using the same logical address as in the writing processing. Also, the storage device 200 may employ the physical address for directly specifying the recording location in the tamper-resistant storage unit 204.

Upon the storage device 200 receiving the license writing command (S168), the storage device 200 makes a request of input of the encrypted license data. In response to the request, the controller 101 of the recording device 100 outputs the encrypted license data Es(Ks1, Ep(KPp2, LIC)) to the storage device 200 (S170).

Upon the storage device 200 receiving the encrypted license data Es(Ks1, Ep(KPp2, LIC)) (S172), the storage device 200 transmits the encrypted license data Es(Ks1, Ep(KPp2, LIC)) thus received, to the second decryption unit 226 in the encryption engine 203. The second decryption unit 226 decrypts the encrypted license data Es(Ks1, Ep(KPp2, LIC)) using the challenge key Ks1 stored therein, thereby acquiring the encrypted license data Ep(KPp2, LIC), which has been encrypted using the public key KPp2 of the storage device 200 (S174). Then, the encrypted license data Ep(KPp2, LIC) thus acquired is transmitted to the third decryption unit 227.

Then, the control unit 220 confirms control information which indicates whether or not a new shared key is to be created (S176). In a case that a new shared key is to be created, i.e., in a case that the current license-data recording is the first recording after holding of the symmetric key Kc1 in Step S136 (in a case of "YES" in S176), the third encryption unit 227 extracts the parameter B*rp1 from the encrypted license data Ep(KPp2, LIC)=B*rp1//Es(KPp2*rp1, LIC) thus transmitted. Then, the third encryption unit 227 computes the shared key Kp2*B*rp1=KPp2*rp1 on the elliptic curve using the parameter B*rp1 and the private key Kp2 of the storage device 200, and holds the shared key thus created (S178).

On the other hand, in a case that a new shared key is not to be created, i.e., in a case that the current license-data recording is the second or subsequent recording (in a case of "NO" in S176), the flow skips Step S178, i.e., the flow proceeds to Step S180 without creating a new shared key Kp2*B*rp1.

The third decryption unit 227 decrypts the encrypted license data Ep(KPp2, LIC) thus transmitted from the second decryption unit 226, using the shared key Kp2*B*rp1 held therein, thereby acquiring the license data LIC (S180). The license data LIC thus acquired is transmitted to the data bus 210 through the local bus 240, and the control unit 220.

As described above, in a case that the current license-data recording is the first recording (in a case of "YES" in S176), the encryption engine 103 makes encryption involving multiplication on an elliptic curve, thereby creating a new shared key Kp2*B*rp1. That is to say, in this case, the encryption engine 103 performs encryption computation based upon the public key cryptosystem. Thus, the encryption engine 103 decrypts the encrypted license data Ep(KPp2, LIC) using the new shared key Kp2*B*rp1 thus created.

On the other hand, in a case that the current license-data recording is the second or subsequent recording (in a case of "NO" in S176), the flow proceeds to Step S180 without creating a new shared key Kp2*B*rp1. In this case, the encryption engine 103 decrypts the encrypted license data Ep(KPp2, LIC) using the shared key Kp2*B*rp1 which has been created in the first license-data recording and stored in the third decryption unit 227, thereby acquiring the license data LIC.

The controller 201 performs storage processing for storing the license data transmitted to the data bus 210, in a recording location in the tamper-resident storage unit 204 according to a specified address (S182).

On the other hand, upon completion of the processing instructed by the license data writing command in the storage device 200, the controller 101 determines whether or not recording of the license data is to be continued (S184).

In a case of consecutively recording of the license data (in a case of "YES" in S184), the flow proceeds to Step S138, thereby restarting the processing starting from issuing of the session information creating command. With the present embodiment, the verification of the certificate, and encryption-computation/decryption-computation based upon the public key cryptosystem are shared among multiple license-data writing procedures, thereby reducing the processing time for the second or subsequent recording processing. Note that there is no need to record the next license data immediately following recording of certain license data. Rather, with such an arrangement, the next data may be recorded at a desired timing as long as the encryption engine 103 and the storage device 200 share the challenge key Kc1, the shared key KPp2*rp1, and the parameter B*rp1, and specifically, as long as the decryption unit 123 of the encryption engine 103 of the recording device 100 and the first encryption unit 225 of the encryption engine 203 of the storage device 200 hold the same challenge key Kc1, and the second encryption unit 124 of the encryption engine 103 of the recording device 100 and the third decryption unit 227 of the encryption engine 203 of the storage device 200 hold the same shared key KPp2*rp1 and the same parameter B*rp1.

Also, an arrangement may be made without any problems, in which the next data is recorded following the procedure starting from Step S102 even if the license data is consecutively recorded. With such an arrangement, the second or subsequent reproducing is performed involving additional processing necessary for the first reproducing in the present embodiment, leading to additional processing time as with the first recording.

On the other hand, in a case that the license data is not consecutively recorded (In a case of "NO" in S184), the processing ends successfully.

With the procedure described above, the license data, which is necessary for decrypting and reproducing the encrypted contents data, is stored in the storage device 200. On the other hand, the encrypted contents data is ordinary data. With the present embodiment, the encrypted contents data is directly stored in the ordinary data storage unit 205 of the storage device 200 according to ordinary commands. Note that description will be omitted regarding the storage processing for the ordinary data.

Note that with the storage device 200, the recording order of the license data and the encrypted contents data is not restricted. Furthermore, an arrangement may be made in which the secure command is issued in a divided form using free time in which the storage device 200 is not storing the encrypted contents data, thereby recording the license data.

While description has been made regarding an arrangement in which the license-data writing command includes information indicating whether or not a new shared key is to be computed, thereby allowing the control unit 220 of the encryption engine 203 of the storage device 200 to determine whether or not the current license-data recording is the first recording or the second or subsequent recording, an arrangement may be made as follows. That is to say, with the present embodiment, the encrypted license data includes the parameter regardless whether or not a new shared key is to be computed. Accordingly, an arrangement may be made in which the encryption engine 203 stores the parameter included in the encrypted license data for the first license-data recording, and confirms whether or not the parameter thus stored in the encryption engine 203 matches the parameter included in the encrypted license data received in the current recording, thereby determining whether or not the current license-data recording is the second or subsequent recording. Also, an arrangement may be made in which the recording device 100 transmits the license data containing no parameter in the second or subsequent license data recording, and the storage device 200 confirms the presence or absence of the parameter contained in the license data, thereby determining whether the current license-data recording is the first recording or the second or subsequent recording. Also, an arrangement may be made in which the encryption engine 203 of the storage device 200 manages the processing procedure in the same way as with the encryption engine 103 of the recording device 100 according to the present embodiment. Note that the encryption engine 103 of the recording device 100 may make determination in the same way as with the encryption engine 203 of the storage device 200.

Note that FIGS. 8 and 9 show an example of the procedure up to the step in which the recording device 100 stores the license data in the storage device 200, and the processing ends successfully.

Figure 10:
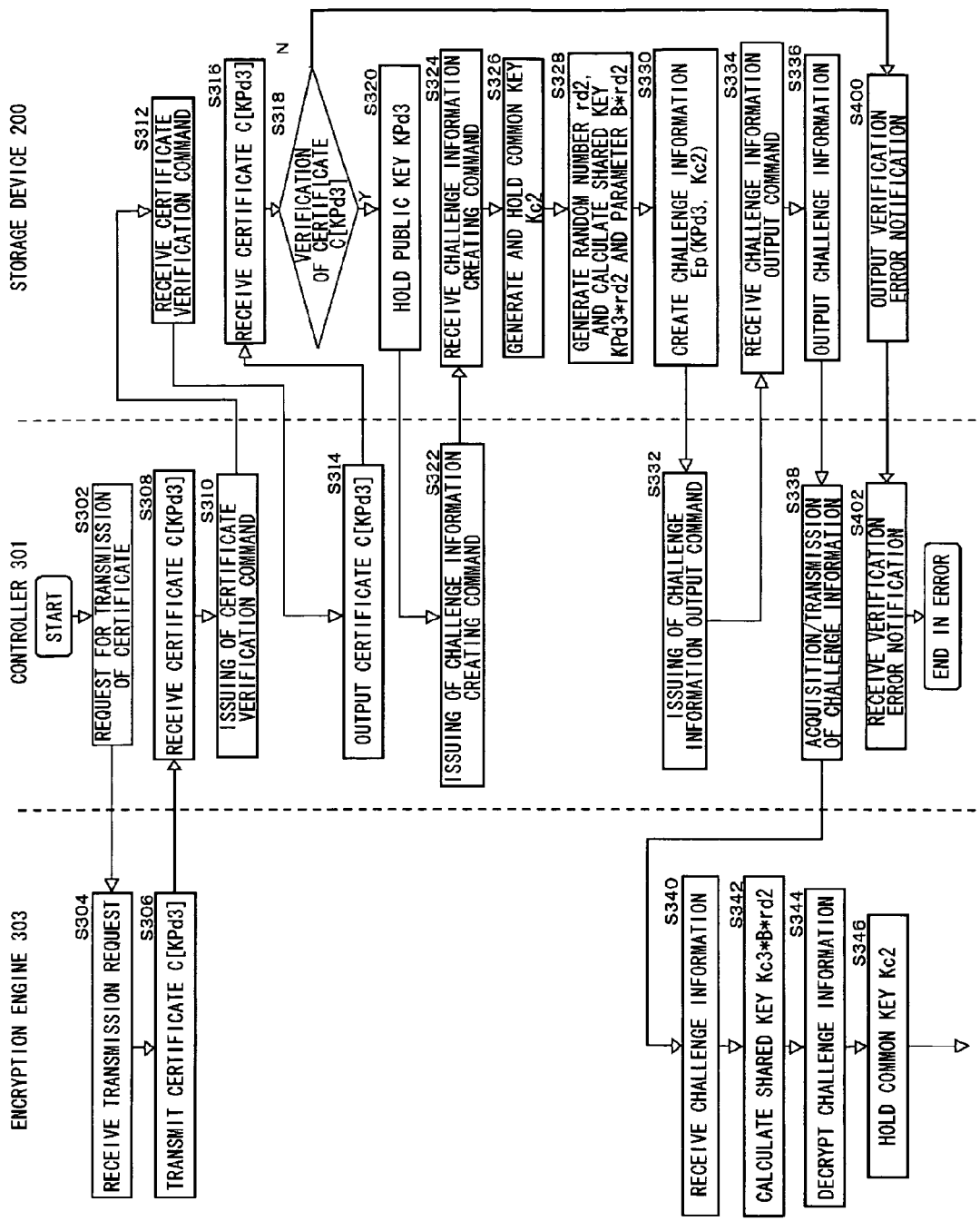
FIG. 10 is a diagram which shows a procedure up to a step in which the reproducing device reads out license data from the storage device.
Figure 11:
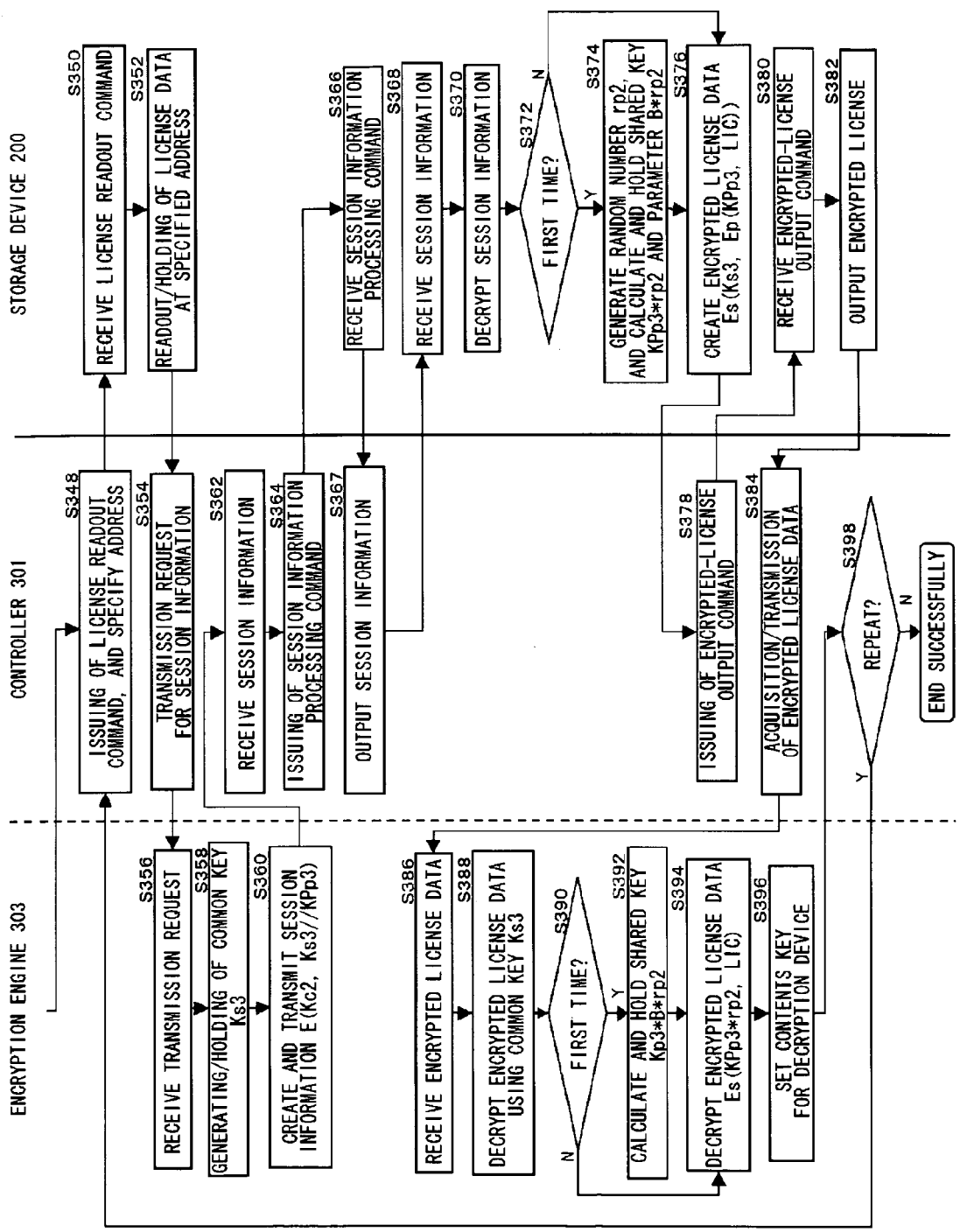
FIG. 11 is a diagram which shows a procedure up to a step in which the reproducing device reads out the license data from the storage device.

FIGS. 10 and 11 show the procedure up to the step in which the reproducing device 300 reads out the license data from the storage device 200.

First, the controller 301 of the reproducing device 300 makes a request of output of the certificate to the encryption engine 303 (S302). Upon the encryption engine 303 receiving the transmission request (S304), the certificate output unit 320 outputs the certificate C[KPd3] to the controller 301 (S306). Upon the controller 301 receiving the certificate C[KPd3] from the encryption engine 303 (S308), the controller 301 issues the certificate verification command to the storage device 200 (S310).

Upon the storage device 200 receiving the certificate verification command (S312), the storage device 200 makes a request of input of the certificate. In response to the request, the controller 301 of the reproducing device 300 outputs the certificate C[KPd3] received from the encryption engine 303, to the storage device 200 (S314).

Upon the storage device 200 receiving the certificate C[KPd3] (S316), the storage device 200 transmits the certificate C[KPd3] to the encryption engine 203 therewithin. In the encryption engine 203, the certificate verification unit 223 verifies the certificate C[KPd3] using the verification key KPa according to instructions from the control unit 220 (S318). In a case that the certificate has not been authenticated (In a case of "NO" in S318), the certificate verification unit 223 transmits a verification error notification to the controller 301 through the control unit 220, the controller 201, and the storage interface 202 (S400). In a case that the controller 301 has received the error notification (S402), the processing ends in error.

On the other hand, in a case that the certificate C[KPd3] has been authenticated (in a case of "YES" in S318), the encryption engine 203 stores the public key KPd3 in the second storage unit 228 (S320).

On the other hand, in a case that the certificate C[KPd3] of the encryption engine 303 has been authenticated in the storage device 200, the controller 301 of the reproducing device 300 issues a first challenge information creating command (S322). Then, the storage device 200 receives the first challenge information creating command (S324). Subsequently, in the encryption engine 203, the random number generating unit 221 generates the challenge key Kc2 according to instructions from the control unit 220, and transmits the challenge key Kc2 thus created, to the second encryption unit 228 and the fourth decryption unit 229. The fourth decryption unit 229 stores the challenge key Kc2 therewithin (S326). Furthermore, the random number generating unit 221 generates the random number rd2, and transmits the random number rd2 thus generated, to the second encryption unit 228. Then, the second encryption unit 228 computes the shared key KPd3*rd2 and the parameter B*rd2 using the public key KPd3 held in Step S320 and the random number rd2 (S328).

Furthermore, the second encryption unit 228 encrypts the challenge key Kc2 received from the random number generating unit 221, using the shared key KPd3*rd2 thus computed, thereby creating challenge information Ep(KPd3, Kc2) (S330).

On the other hand, upon completion of the processing instructed by the challenge information creating command in the storage device 200, the controller 101 issues a challenge information output command (S332). Upon the storage device 200 receiving the challenge information output command (S334), the controller 201 acquires the challenge information Ep(KPd3, Kc2) from the encryption engine 203, and outputs the challenge information Ep(KPd3, Kc2) to the controller 301 of the reproducing device 300 (S336).

Upon reception of the challenge information Ep(KPd3, Kc2), the controller 301 of the reproducing device 300 transmits the challenge information Ep(KPd3, Kc2) thus received, to the encryption engine 303 (S338). Then, upon the encryption engine 303 receiving the challenge information Ep(KPd3, Kc2) (S340), the first decryption unit 322 of the encryption engine 303 separates the challenge information Ep(KPd3, Kc2) thus received, into the parameter B*rd2 and the encrypted challenge key Es(KPd3*rd2, Kc2). Then, the first description unit 322 computes the shared key Kd3*B*rd2 (=KPd3*rd2) using the parameter B*rd2 and the private key Kd3 of the reproducing device 300 (S342). The first description unit 322 decrypts the encrypted challenge key Es(KPd3*rd2, Kc2) using the shared key thus created, thereby acquiring the challenge key Kc2 (S322). The challenge key Kc2 thus acquired is transmitted to the encryption unit 323. The encryption unit 323 holds the challenge key Kc2 thus received (S346).

On the other hand, the controller 301 of the reproducing device 300 issues a license readout command to the storage device 200 (S348). The license readout command includes an address for specifying the readout location in the tamper-resistant storage unit 204. Upon the storage device 200 receiving the license readout command (S350), the storage device 200 reads out the license data LIC stored at the specified address in the tamper-resistant storage unit 204. The license data LIC thus read out is held by the third encryption unit 230 of the encryption engine 203 (S352).

On the other hand, the controller 301 of the reproducing device 300 makes a request of transmission of the session information to the encryption engine 303 (S354). Upon the encryption engine 303, receiving the transmission request (S356), in the encryption engine 303, the random number generating unit 321 generates the session key Ks3, and transmits the session key Ks3 thus generated, to the encryption unit 323 and the second decryption unit 324. The second decryption unit 324 stores the session key Ks3 thus received (S358).

The encryption unit 323 links the session key Ks3 thus generated by the random number generating unit 321 and the public key KPp3 of the reproducing device 300, thereby creating linked key data Ks3//KPp3. Then, the encryption unit 323 encrypts the linked key data Ks3//KPp3 thus created, using the challenge key Kc2 held in Step S346, thereby creating session information Es(Kc2, Ks3//KPp3). The session information Es(Kc2, Ks3//KPp3) thus created is transmitted to the controller 301 (S360). Upon the controller 301 receiving the session information Es(Kc2, Ks3//KPp3) (S362), the controller 301 issues a session information processing command to the storage device 200 (S364). The session information processing command includes the control information indicating whether or not a new shared key is to be created.

Upon the storage device 200 receiving the second session information processing command (S366), the storage device 200 makes a request of input of the session information. In response to the request, the controller 301 of the reproducing device 300 outputs the session information Es(Kc2, Ks3//KPp3) received from the encryption engine 303, to the storage device 200 (S367). Upon the storage device 200 receiving the session information Es(Kc2, Ks3//KPp3) (S368), the storage device 200 transmits the session information Es(Kc2, Ks3//KPp3) thus received, to the fourth decryption unit 229 of the encryption engine 203. The fourth decryption unit 229 decrypts the session information Es(Kc2, Ks3//KPp3) thus received, using the challenge key Kc2 stored in Step S326. Thus, the fourth decryption unit 229 acquires the session key Ks3 issued by the reproducing device 300 and the public key KPp3 of the reproducing device 300, and transmits the session key Ks3 and the public key KPp3 thus acquired, to the fourth encryption unit 231 and the third encryption unit 230, respectively (S370).

Subsequently, the control unit 200 confirms the control information indicating whether or not a new shared key is to be created (S372). In a case that a new shared key is to be created, i.e., in a case of the first reproducing processing after creation of the challenge key Kc2 in Step S326 (in a case of "YES" in S372), the control unit 220 instructs the random number generating unit 221 to generate the random number rp2. In response to the request, the random number generating unit 221 generates the random umber rp2, and transmits the random number rp2 thus created, to the third encryption unit 230. The third encryption unit 230 computes the shared key KPp3*rp2 and the parameter B*rp2 using the random number thus received, and holds the shared key and the parameter thus created (S374).

On the other hand, in a case that a new shared key is not to be created, i.e., in a case of the second or subsequent reproducing processing after creation of the challenge key Kc2 in Step S326 (in a case of "NO" in S372), the flow skips Step S374, and proceeds to the following Step S376 without creating a new shared key KPp3*rp2 and the parameter B*rp2.

The third encryption unit 230 encrypts the license data LIC held in Step S352, using the shared key KPp3*rp2 thus held, and links the encryption result and the parameter B*rp2 thus held, thereby creating encrypted license data B*rp2//Es(KPp3*rp2, LIC)=Ep(KPp3, LIC). The encrypted license data thus created is transmitted to the fourth encryption unit 231. The fourth encryption unit 231 encrypts the encrypted license data Ep(KPp3, LIC) using the session key Ks3 received from the fourth decryption unit 229, thereby creating encrypted license data Es(Ks3, Ep(KPp3, LIC)) (S376).

Upon completion of the processing instructed by the session information processing command in the storage device 200, i.e., upon creation of the encrypted license data, the controller 301 issues an encrypted license output command (S378). Upon the storage device 200 receiving the encrypted license output command (S380), the controller 201 acquires the encrypted license data Es(Ks3, Ep(KPp3, LIC)), and outputs the encrypted license data thus acquired, to the controller 301 of the reproducing device 300 (S382).

Upon reception of the encrypted license data Es(Ks3, Ep(KPp3, LIC)) from the storage device 200, the controller 301 of the reproducing device 300 transmits the encrypted license data Es(Ks3, Ep(KPp3, LIC)) thus received, to the encryption engine 303 (S384). Then, upon the encryption engine 303 receiving the encrypted license data (S386), the second decryption unit 324 decrypts the encrypted license data Es(Ks3, Ep(KPp3, LIC)) using the session key Ks3 stored therein in Step S358, and transmits the decryption result Ep(KPp3, LIC) to the third decryption unit 325.

Then, the third decryption unit 325 determines whether the current processing is the first processing or the second or subsequent processing after holding of the challenge key Kc2 in Step S346 (S390). In a case of the first reproducing (in a case of "YES" in S390), the third decryption unit 325 extracts the parameter B*rp2 from the encrypted license data Ep(KPp3, LIC)=B*rp2//Es(KPp3*rp2, LIC) thus received, and computes the shared key Kp3*B*rp2=KPp3*rp2 on the elliptic curve using the private key Kp3 of the reproducing device 300. The computation results are stored in the third decryption unit 325 (S392).

On the other hand, in a case that a new shared key is not to be created, i.e., in a case of the second or subsequent reproducing (in a case of "NO" in S390), the flow skips Step S392, i.e., the flow proceeds to the following step S394 without creating a new shared key Kp3*B*rp2.

The third decryption unit 325 extracts the encrypted license data Es(KPp3*rp2, LIC) from Ep(KPp3, LIC)=B*rp2//Es(KPp3*rp2, LIC) thus received, and decrypts the encrypted license data Es(KPp3*rp2, LIC) using the shared key Kp3*B*rp2 stored therein, thereby acquiring the license data LIC (S394). The license data thus acquired is transmitted to the decryption unit 304 (S396), and is used by the decryption device 304 for decrypting encrypted contents data. With the procedure described above, the reproducing device 300 reads out the license data necessary for decrypting the encrypted contents from the storage device 200.

As described above, with the present embodiment, in a case that the current reproducing is the first reproducing (in a case of "YES" in S390), the encryption engine 303 of the reproducing device 300 performs encryption computation involving multiplication on an elliptic curve for creating a new shared key Kp3*B*rp2, i.e., performs encryption computation based upon the public key cryptosystem. Then, the encryption engine 303 of the reproducing device 300 decrypts the encrypted license data Ep(KPp3, LIC) using the new shared key Kp3*B*rp2 thus computed, thereby acquiring the license data LIC.

On the other hand, in a case that the current reproducing is the second or subsequent reproducing (in a case of "NO" in S390), the flow proceeds to Step S394 for performing decryption processing without creating a new shared key Kp3*B*rp2 and a new parameter B*rp2. In this case, the encryption engine 303 of the reproducing device 300 decrypts the encrypted license data Ep(KPp3, LIC) using the shared key Kp3*B*rp2 held by the third decryption unit 325, thereby acquiring the license data LIC.

Let us consider a situation in which other license data is consecutively read out following readout of certain license data (in a case of "YES" in S398). In this case, with the controller 301 of the reproducing device 300, the flow proceeds to Step S348, thereby restarting the procedure starting from the step where the license readout command is issued. With the present embodiment, the verification of the certificate is shared among multiple license-data writing procedures, thereby reducing the processing amount. While description has been made regarding an example in which multiple license data sets are consecutively read out, with such a configuration, there is no need to read out the next license data immediately following readout of certain license data. Rather, with such a configuration, the next data may be read out at a desired timing as long as the encryption engine 303 and the storage device 200 share the challenge key Kc2, the shared key KPp3*rp2, and the parameter B*rp2, and specifically, as long as the fourth decryption unit 229 of the encryption engine 203 of the storage device 200 and the encryption unit 323 of the encryption engine 303 of the reproducing device 300 hold the same challenge key Kc2, and the third encryption unit 230 of the encryption engine 203 of the storage device 200 and the second decryption unit 324 of the encryption engine 303 of the reproducing device 300 hold the same shared key KPp3*rp2 and the same parameter B*rp2.

Also, an arrangement may be made without any problems, in which the next data is read out following the procedure starting from Step S302 even if the license data is consecutively read out. With such an arrangement, the second or subsequent reproducing is performed involving additional processing necessary for the first reproducing in the present embodiment, leading to additional processing time as with the first recording.

On the other hand, in a case that the license data is not consecutively read out (in a case of "NO" in S398), the processing ends successfully according to instructions from the controller 301.

While description has been made in the present embodiment regarding an arrangement in which the license-data writing command includes information indicating whether or not a new shared key is to be computed, thereby allowing the control unit 220 of the encryption engine 203 of the storage device 200 to determine whether or not the current license-data recording is the first recording or the second or subsequent recording, an arrangement may be made as follows. That is to say, with the present embodiment, the session information includes the public key regardless whether or not a new shared key is to be computed. Accordingly, an arrangement may be made in which the encryption engine 203 stores the public key KPp3 included in the session information for the first reproducing, and confirms whether or not the public key KPp3 thus stored in the encryption engine 203 matches the public key KPp3 included in the current session information thus received, thereby determining whether or not the current reproducing is the second or subsequent reproducing. Also, an arrangement may be made in which the reproducing device 300 transmits the session information containing no public key KPp3, and the storage device 200 confirms the presence or absence of the public key KPp3, thereby determining whether the current reproducing is the first reproducing or the second or subsequent reproducing. Also, an arrangement may be made in which the control unit 220 manages and determines the processing procedure.

As described above, the license data stored in the storage device 200 can be duplicated in other storage devices (i.e., the license data stored in the storage device 200 is available for use by other storage devices), thereby storing the license data in other storage devices. Also, with such a procedure, the license data stored in the storage device 200 can be moved to another storage device (i.e., the license data stored in the storage device 200 is deleted or revoked), thereby storing the license data in another storage device. Let us say that other storage devices, in which the license data are to be stored, have the same functions as the storage device 200. In this case, it is needless to say that the license data can be transmitted from one to another among these storage devices, and the storage device, which has received the license data, can store the license data thus received. In this case, the license data is transmitted from the storage device 200 to another storage device in the same way as the license data is supplied from the storage device 200 to the reproducing device 300. Also, the license data is transmitted from other storage devices to the storage device 200 in the same way as the license data supplied from the recording device 100 is stored in the storage device 200.

With the present embodiment described above, the example in which the data is encrypted using the shared key Kp2*B*rp1=KPp2*rp1 or Kp3*B*rp2=KPp3*rp2 is explained to simplify the explanation. The data may be encrypted by the data which is derived from the function for creating the data which has the same size as the key of the symmetric key cryptosystem from Kp2*B*rp1 or Kp3*B*rp2. Thus, the difference of the key form between the shared key Kp2*B*rp1 or KP3*B*rp2, which is shared based on the elliptic curve cryptography, and the key which can be used for the symmetric key cryptosystem can be compensated. In this case, the function for creating the data for encryption which has the size available for the symmetric key cryptosystem from one or two coordinates of the shared key Kp2*B*rp1 or Kp3*B*rp2, which is two dimensional coordinate on the elliptic curve, must be shared between the license data transmitter and the license data receiver with the base point beforehand.

With the present embodiment described above, recording/readout is made using a combination of a public key cryptosystem and a symmetric-key cryptosystem. Note that the symmetric-key cryptosystem requires smaller computation amount than that of the public key cryptosystem, and is readily realized by hardware means. This enables high-speed consecutive accesses (recording/readout) of confidential data such as license data with sufficient security. Thus, this improves processing efficiency of input/output of confidential data in an encrypted form between a storage device and a host device.

Second Embodiment

Figure 12:
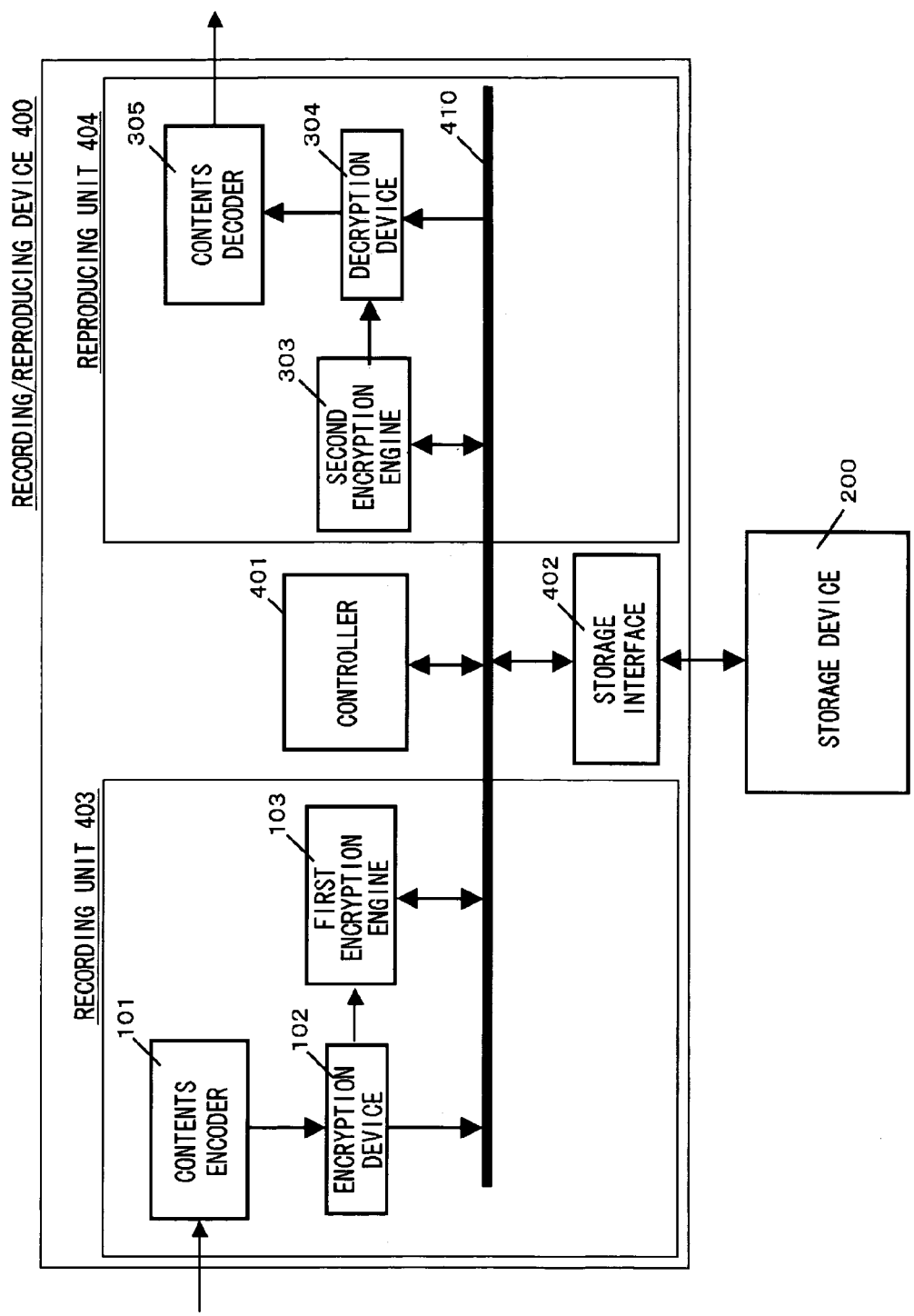
FIG. 12 is a diagram which shows an internal configuration of a recording/reproducing device according to a second embodiment.

FIG. 12 shows a configuration of a recording/reproducing device 400 according to a second embodiment. With the present embodiment, the recording device 100 and the reproducing device 300 according to the first embodiment are realized in the form of a single device, i.e., the recording/reproducing device 400.

The recording/reproducing device 400 according to the present embodiment includes a controller 401, a storage interface 402, a recording unit 403, a reproducing unit 404, and a data bus 410 for connecting at least a part of these components. The recording unit 403 has the same configuration as that of the recording device 100 according to the first embodiment shown in FIG. 2. On the other hand, the reproducing unit 404 has the same configuration as that of the reproducing device 300 shown in FIG. 3. Note that in the drawing, the same components as those in the first embodiment are denoted by the same reference numerals.

The encryption engine 103 according to the present embodiment corresponds to the encryption engine 103 of the recording device 100 according to the first embodiment. The encryption engine 303 according to the present embodiment corresponds to the encryption engine 303 of the reproducing device 300 according to the first embodiment. The encryption engine 103 according to the present embodiment has the same internal configuration as that of the encryption engine 103 according to the first embodiment shown in FIG. 5. The encryption engine 303 according to the present embodiment has the same internal configuration as that of the encryption engine 303 according to the first embodiment shown in FIG. 6. The controller 401 has both the same functions as those of the controller 101 of the recording device 100 and the same functions as those of the controller 301 of the reproducing device 300 according to the first embodiment. The storage interface 402 controls input/output of data between the recording/reproducing device 400 and the storage device 200. The data bus 410 electrically connects the components of the recording/reproducing device 400.

The recording/reproducing device 400 according to the present embodiment operates in the same way as with the recording device 100 and the reproducing device 300 according to the first embodiment. Specifically, the same can be said of the operation of the recording/reproducing device 400 according to the present embodiment as described in the first embodiment, replacing the controllers 101 and the 301 with the controller 401, replacing the storage interfaces 102 and 104 with the storage interface 402, and replacing the data buses 110 and 310 with the data bus 410.

While description has been made in the present embodiment regarding an arrangement in which the recording unit 403 and the reproducing unit 404 include the encryption engine 103 and the encryption engine 303, respectively, an arrangement may be made in which the recording unit 403 and the reproducing unit 404 share a single encryption engine having the functional blocks included in the encryption engines 103 and 303. With such a configuration, the single encryption engine has the same configuration as that of the encryption engine 203 of the storage device 200 shown in FIG. 7 according to the first embodiment.

Third Embodiment

Figure 13:
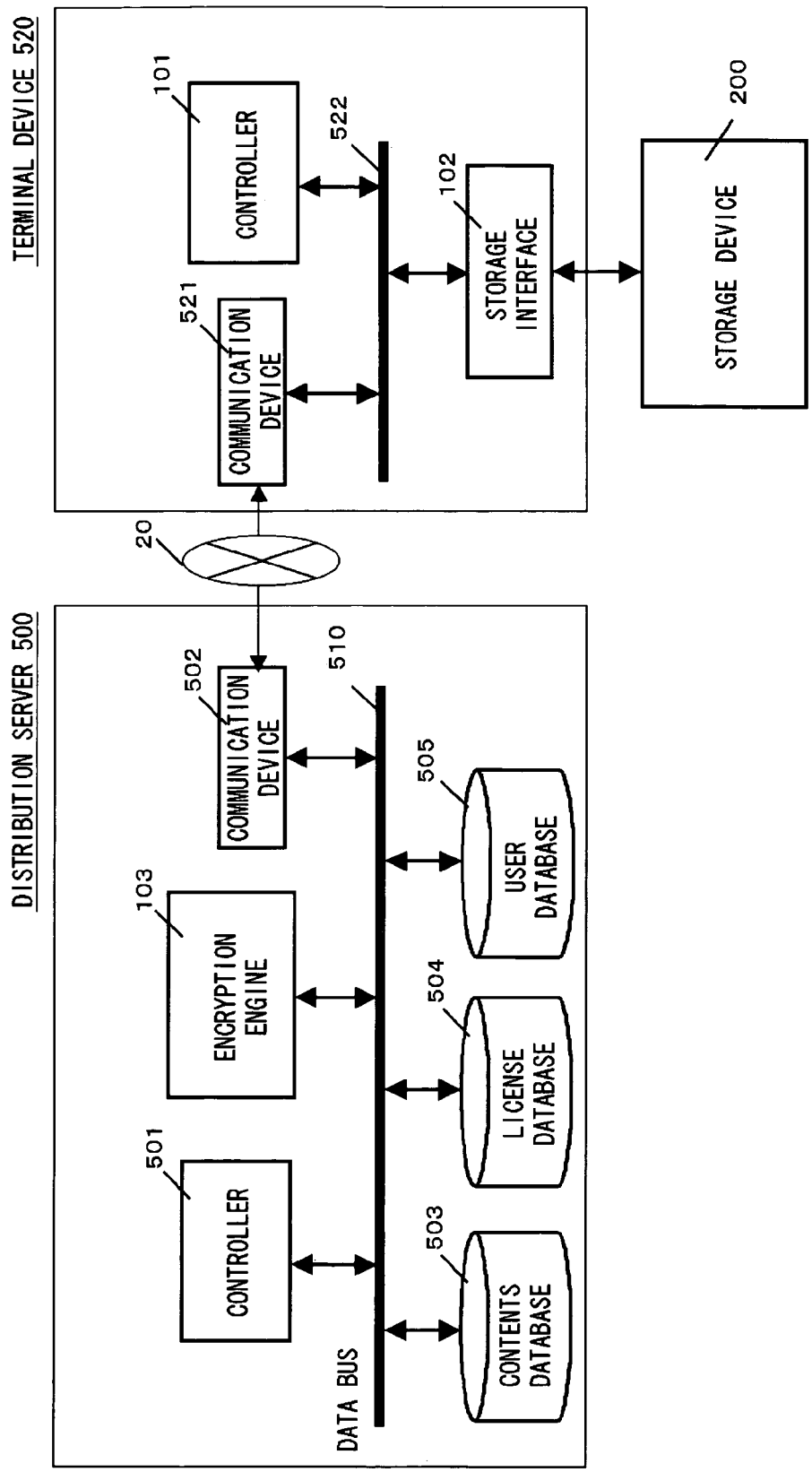
FIG. 13 is a diagram which shows an internal configuration of a contents distribution system according to a third embodiment.

FIG. 13 shows a configuration of contents distribution system according to a third embodiment. With the present embodiment, the recording device 100 according to the first embodiment is realized by a distribution server 500 for distributing contents and a terminal device 520 for receiving the contents thus provided. Note that in the drawing, the same components as those of the recording device 100 according to the first embodiment are denoted by the same reference numerals.

The distribution server 500 includes an encryption engine 103, a communication device 502, a contents database 503, a license database 504, a user database 505, a controller 501 for controlling these components, and a data bus 510 for electrically connecting these components. The terminal device 520 includes the controller 101, the storage interface 102, a communication device 521, and a data bus 522 for electrically connecting these components. The distribution server 500 and the terminal device 520 are connected to the Internet 20 which is an example of a network through the communication devices 502 and 521, respectively.

The encryption engine 103 of the distribution server 500 has the same functions as those of the encryption engine 103 according to the first embodiment. The controller 101 and the storage interface 102 of the terminal device 520 have the same functions as those of the controller 101 and the storage interface 102 according to the first embodiment, respectively.

The contents database 503 holds contents data which is to be provided to the user. The license database 504 holds license data containing a contents key for encrypting the contents data. With the present embodiment, the contents data is stored in the contents database 503 in the form of encrypted data which has been encrypted using the contents key. Also, an arrangement may be made in which the distribution server 500 further including the contents encoder 105 and the encryption device 104 reads out non-encrypted contents data from the contents database 503 storing the non-encrypted contents data, and encodes and encrypts the contents data thus read out, thereby creating encrypted contents data. The user database 505 holds the user information regarding the user to which the contents are to be provided. For example, the user database 505 may hold the user private information, the address of the user terminal device 520, the purchase history regarding contents, fee information, and so forth.

The controller 501 reads out encrypted contents from the contents database 503, and provides the encrypted contents thus read out, to the user, in response to the request from the user. Then, the controller 501 provides license data to the user, which allows the encryption engine 103 to decrypt the encrypted contents, following which the controller 501 updates the user database 505 for the contents fee of the contents providing service.

The contents distribution system according to the present embodiment has the same configuration as the system according to the first embodiment, replacing the data bus 510, the communication device 502, the Internet 20, the communication device 512, and the data bus 522, with the data bus 110 for electrically connecting the components included in the system.

The contents distribution system according to the present embodiment performs encryption input/output processing following the same procedure as with the first embodiment. With the present embodiment, the encryption engine 103 and the controller 101 communicate with each other via the Internet 20. With such a configuration, the encryption engine 103 and the controller 101 perform transmission/reception of data in the form of encrypted communication at all times as described above with reference to FIGS. 8 and 9. Thus, the communication is made with high tamper-resistant performance between the encryption engine 103 and the controller 101, even though via the Internet.

An arrangement may be made in which the storage device 200 is mounted to the reproducing device 300 according to the first embodiment, or the recording/reproducing device 400 according to the second embodiment, thereby allowing reproducing of the contents. Also, an arrangement may be made in which the terminal device 520 includes the reproducing unit 404 of the recording/reproducing device 400, thereby allowing reproducing of the contents.

As described above, description has been made regarding the present invention with reference to the aforementioned embodiments. The above-described embodiments have been described for exemplary purposes only, and are by no means intended to be interpreted restrictively. Rather, it can be readily conceived by those skilled in this art that various modifications may be made by making various combinations of the aforementioned components or the aforementioned processing, which are also encompassed in the technical scope of the present invention.

For example, while description has been made in the aforementioned embodiments regarding arrangements in which the encryption engine includes separate functional blocks of a functional block for encryption and a functional block for decryption, such functional blocks share the circuit on a component basis. This enables a reduced circuit scale, thereby reducing the size of the system and power consumption thereof.

With the present invention, various modifications may be made as appropriate within the scope of the technical idea of the present invention as laid forth in the appended claims.

What is claimed is:

1. A content usage right information providing device for providing license data containing a content key for decrypting encrypted content data to a content usage right information receiving device, the content usage right information providing device comprising:
a processor;
a memory having a program, when executed, causing the processor to perform the following functions:
an interface function for receiving from the content usage right information receiving device a certificate containing a first public key;
a verification function for verifying the certificate; and
a first encryption function for encrypting a first symmetric key by using the first public key contained in the certificate and creating an encrypted first symmetric key, wherein the interface function transmits the encrypted first symmetric key to the content usage right information receiving device and receives from the content usage right information receiving device an encrypted second symmetric key which is encrypted by using the first symmetric key, the processor further performs the following functions:

a decryption function for decrypting the encrypted second symmetric key by using the first symmetric key and acquiring a second symmetric key and a second public key;

a second encryption function for encrypting license data by using a shared key and creating first encrypted license data; and a third encryption function for encrypting the first encrypted license data by using the second symmetric key and creating second encrypted license data, wherein and wherein the interface function transmits the second encrypted license data, and after the first symmetric key and the shared key are shared between the content usage right information providing device and the content usage right information receiving device, the interface function receives an encrypted second symmetric key in which the second symmetric key is newly generated in the content usage right information receiving device, the decryption function decrypts the encrypted second symmetric key by using the first symmetric key and acquiring the second symmetric key which is newly generated, the second encryption function encrypts license data by using the shared key and creates first encrypted license data, the third encryption function encrypts the first encrypted license data by using the second symmetric key and creates second encrypted license data, and the interface function transmits the second encrypted license data.

2. A content usage right information receiving device for receiving license data containing a content key for decrypting encrypted content data from a content usage right information providing device, the content usage right information receiving device comprising:

a processor;

a memory having a program, when executed, causing the processor to perform the following functions:

a certificate output function for outputting a certificate containing a first public key of the content usage right information receiving device;

an interface function for transmitting the certificate to the content usage right information providing device and receiving from the content usage right information providing device an encrypted first symmetric key;

a first decryption function for decrypting the encrypted first symmetric key by using a first private key corresponding to the first public key and acquiring a first symmetric key;

a generating function for generating a second symmetric key; and a first encryption function for concatenating the second symmetric key and a second public key of the content usage right information receiving device, and encrypting a concatenated key by using the first symmetric key and creating an encrypted second symmetric key, wherein the interface function transmits the second encrypted second symmetric key to the content usage right information providing device and receives first encrypted license data from the content usage right information providing device, the processor further performs the following functions:

a second decryption function for decrypting the first encrypted license data by using the second symmetric key and acquiring second encrypted license data; and a third decryption function for acquiring a shared key and license data from the second encrypted license data, and after the first symmetric key and the shared key are shared between the content usage right information providing device and the content usage right information receiving device, the generating function generates a new second symmetric key, the first encryption function encrypts the new second symmetric key by using the first symmetric key and creating an encrypted second symmetric key, the interface function transmits the encrypted second symmetric key to the content usage right information providing device and receives first encrypted license data, the second decryption function decrypts the first encrypted license data by using the second symmetric key and acquires second encrypted license data, and the third decryption function decrypts the second encrypted license data by using the shared key and acquires license data.

* * * * *